United States Patent
Watanabe et al.

(10) Patent No.: US 6,267,855 B1
(45) Date of Patent: *Jul. 31, 2001

(54) WATER PURIFYING APPARATUS

(75) Inventors: Kazushige Watanabe, Maebashi; Motoharu Sato, Honjo; Takaaki Suga, Sawa-gun, all of (JP)

(73) Assignee: Sanden Corporation (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/305,113

(22) Filed: May 4, 1999

(30) Foreign Application Priority Data

May 7, 1998 (JP) .................................. 10-124610
May 29, 1998 (JP) .................................. 10-149540

(51) Int. Cl.[7] ....................................... C25B 9/00

(52) U.S. Cl. ..................... 204/272; 204/273; 204/228.3; 204/228.6

(58) Field of Search .................................. 204/272, 273, 204/228.3, 228.6; 205/743

(56) References Cited

U.S. PATENT DOCUMENTS

| 5,306,409 | * | 4/1994 | Arai | 204/228.2 |
| 5,788,820 | * | 12/1998 | Liu | 204/212 |
| 5,853,562 | * | 12/1998 | Eki et al. | 205/273 |
| 6,126,797 | * | 10/2000 | Sato et al. | 204/272 |

* cited by examiner

*Primary Examiner*—Kathryn Gorgos
*Assistant Examiner*—Wesley A. Nicolas
(74) *Attorney, Agent, or Firm*—Banner & Witcoff, Ltd.

(57) ABSTRACT

In a water purifying apparatus (1) having inner and outer cylindrical electrodes (51,52) concentrically arranged together to form a water channel (500) therebetween, the outer electrode has a plurality of small perforations (55) penetrating therethrough. The electrodes are placed in a water tank (2) reserving raw water. A voltage is applied between the electrodes for causing electrolysis of the raw water in the water channel. As a result of the electrolysis, the raw water is processed into purified water. Resultant gases generated by the electrolysis may be released from the water channel through the small perforations of the electrodes. In addition, the inner electrode may have small perforations penetrating therethrough.

12 Claims, 22 Drawing Sheets

WATER PURIFYING APPARATUS

BACKGROUND OF THE INVENTION

This invention relates to a water purifying apparatus for purifying raw water such as tap water and groundwater to provide purified water for domestic or business use.

Generally, a conventional water purifying apparatus comprises a cistern and a chlorine generator placed in the cistern. The chlorine generator comprises a pair of flat electrodes serving as an anode and a cathode. In the chlorine generator, these electrodes are applied with a d.c. voltage at a predetermined interval monitored or measured by a timer to electrolyze raw water within the cistern. As a result, an appropriate amount of hypochlorous acid is produced as effective chlorine effective in sterilization.

In the above-mentioned electrolyzing operation, various chemical reactions take place. These chemical reactions are represented by:

At the cathode:

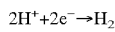

At the anode:

In water:

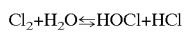

Herein, HOCl represents the hypochlorous acid.

In the conventional water purifying apparatus, however, the raw water is at first reserved in the cistern and then electrolyzed so that the raw water is processed into purified water to add hypochlorous acid therein. Thereafter, the purified water is delivered from the cistern through a pipe to a terminal unit such as a tap or a dispensing valve of a beverage dispenser. If the pipe is long, a pump is essential to feed the purified drinking water. Depending upon the length of the pipe, the pump must have an extremely large scale. Thus, the water purifying apparatus is uneconomical. Furthermore, in order to provide the purified water of a sufficient amount to meet the demand, the cistern is inevitably increased in size. As a result, it is difficult to achieve a compact water purifying apparatus.

In order to solve the above-mentioned problem, the present inventors have proposed a water purifying apparatus in U.S. patent application Ser. No. 09/168,170 (Thailand patent application No. 046502) corresponding to Japanese Patent Application No. 9-277333 (277333/1997). The water purifying apparatus is for purifying raw water containing chlorine ions to provide purified water containing effective chlorine. The water purifying apparatus comprises a water tank for reserving the raw water, a cylindrical inner electrode placed in the water tank, a cylindrical outer electrode concentrically arranged around the inner electrode to define a water channel between the inner and the outer electrodes for passing the raw water, and voltage applying means connected to the inner and the outer electrodes for applying a voltage between the inner and the outer electrodes. The voltage causes electrolysis of the raw water in the water channel to process the raw water into the purified water. A combination of the inner and the outer electrodes serves as the chlorine generator.

In the water purifying apparatus, the chlorine generator has dual functions as a cistern-type chlorine generator for processing still water reserved in the water tank during a suspension period in which water supply is suspended and as a channel-type chlorine generator for processing running water flowing through the water tank during a supply period in which the water supply is carried out. Therefore, it is possible to stably provide the purified water and to reduce the size of the water purifying apparatus as compared with the water purifying apparatus of a cistern type.

During the suspension period, however, hypochlorous acid produced between the inner and the outer electrodes tends to stay within the space defined by the inner and the outer electrodes. This results in nonuniform distribution of concentration of hypochlorous acid in the raw water reserved in the water tank. Thus, it is difficult to provide the purified water having a uniform and desired chlorine concentration during the supply period. Furthermore, oxygen gas and hydrogen gas generated by the electrolysis as resultant gases are hardly released from an outer surface of the inner electrode and an inner surface of the outer electrode. As a consequence, the resultant gases tend to stay within the space defined by the inner and the outer electrodes. This bring about decrease in efficiency of electrolysis in the chlorine generator.

Besides, when tap water as the raw water is electrolyzed by the use of the chlorine generator, the amount of effective chlorine (hypochlorous acid) generated by the electrolysis is different depending upon the chlorine ion concentration or the water temperature of the tap water.

At first, consideration will be made about the relationship between the chlorine ion concentration and the amount of effective chlorine. When the chlorine ion concentration is high and low, the amount of effective chlorine is great and small, respectively. It is noted here that the tap water in a big city generally relies upon a surface water of a river as a water resource and therefore exhibits a wide range of daily or hourly variation of the chlorine ion concentration. Accordingly, the amount of effective chlorine generated by the electrolysis also exhibits a wide range of such daily or hourly variation. Under the circumstances, it is difficult to continuously keep the amount of effective chlorine at a desired value in the purified water obtained by electrolyzing the tap water of the above-mentioned origin. Furthermore, the range of daily or hourly variation in chlorine ion concentration of the tap water is greatly different depending upon a regional difference of a water quality. This also makes it difficult to continuously keep the amount of effective chlorine in the purified water at a desired value.

Next, the relationship between the water temperature and the amount of effective chlorine will be considered. When the water temperature is high and low, the amount of effective chlorine is great and small, respectively. If the water temperature of the tap water exhibits a wide range of daily or hourly variation, the amount of effective chlorine generated by the electrolysis also exhibits a wide range of daily or hourly variation. Under the circumstances, it is difficult to continuously keep the amount of effective chlorine at a desired value in the purified water obtained by electrolyzing the tap water which is wide in temperature variation. Furthermore, the range of daily or hourly variation in water temperature of the tap water is greatly different depending upon a regional or a seasonal difference. This also makes it difficult to continuously keep the amount of effective chlorine in the purified water at a desired value.

In order to overcome the above-mentioned difficulties, it is proposed to energize the electrodes with an output level of a power supply controllably changed in correspondence to the water quality or the water temperature. In this manner, an appropriate chlorine concentration is obtained. However, changing the output level in proportion to the water quality or the water temperature inevitably results in an increased scale of the power supply and in high cost.

SUMMARY OF THE INVENTION

It is therefore an object of this invention to provide a water purifying apparatus which is capable of achieving uniform distribution of hypochlorous acid concentration in raw water reserved in a water tank during a suspension period in which water supply is suspended.

It is another object of this invention to provide a water purifying apparatus which is capable of preventing a decrease in efficiency of electrolysis by promoting the release of resultant gases generated by the electrolysis from surfaces of electrodes.

It is still another object of this invention to provide a water purifying apparatus which is capable of obtaining an appropriate concentration of effective chlorine by controlling an energizing time in correspondence to a water quality or a water temperature.

Other objects of the present invention will become clear as the description proceeds.

A water purifying apparatus to which the present invention is applicable is for purifying raw water containing chlorine ions to provide purified water containing effective chlorine. The water purifying apparatus comprises a water tank for reserving the raw water, a cylindrical inner electrode placed in the water tank, a cylindrical outer electrode concentrically arranged around the inner electrode to define a water channel between the inner and the outer electrodes for passing the raw water, and voltage applying means connected to the inner and the outer electrodes for applying a voltage between the inner and the outer electrodes. The voltage causes electrolysis of the raw water in the water channel to process the raw water into the purified water. In the water purifying apparatus, at least one of the inner and the outer electrodes has a plurality of small perforations penetrating therethrough.

DESCRIPTION OF THE PREFERRED EMBODIMENTS

Figure 1:
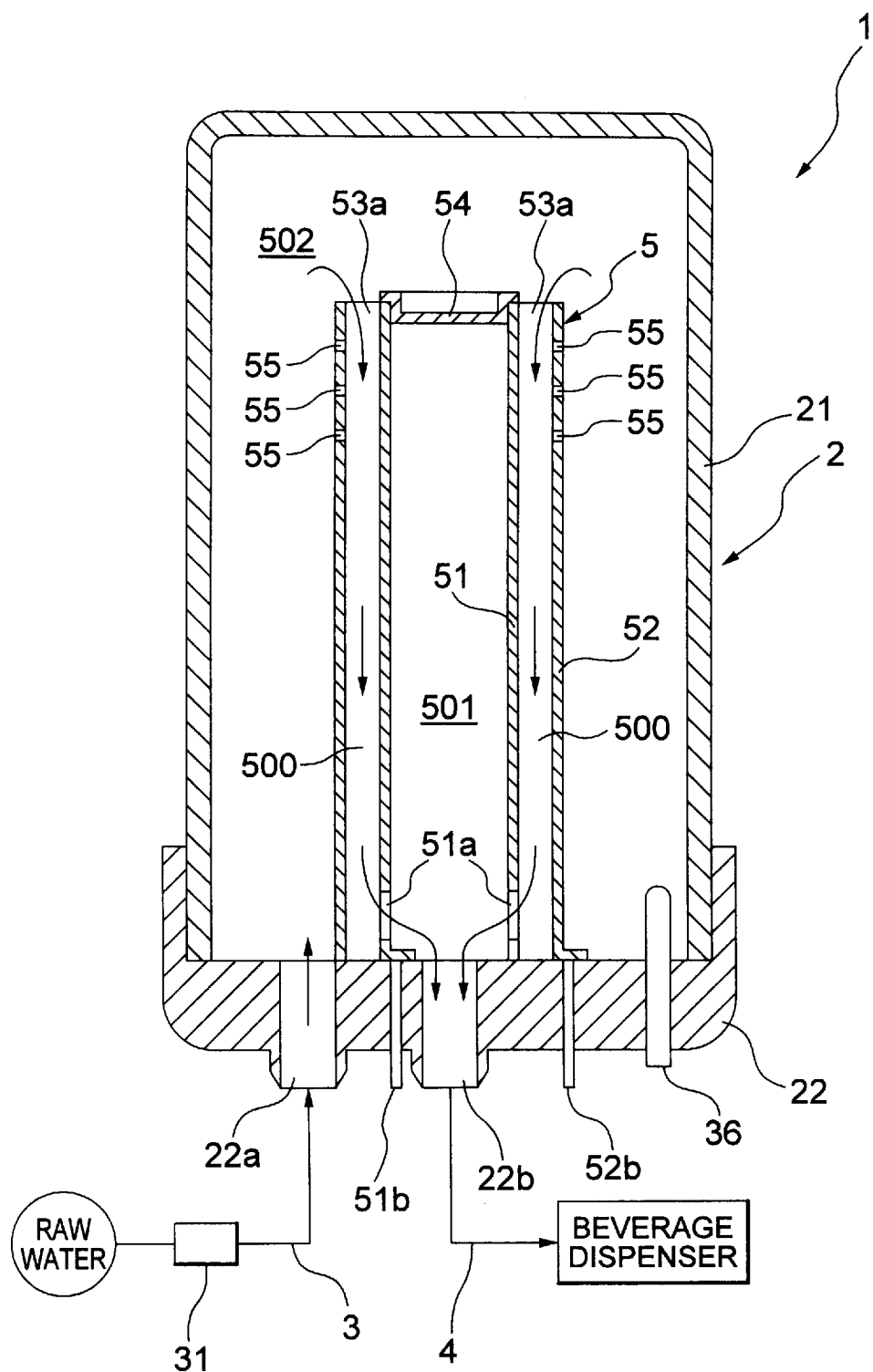
FIG. 1 is a vertical sectional view of a water purifying apparatus according to a first embodiment of this invention.

Now, description will be made about several preferred embodiments of this invention with reference to the drawing.

At first referring to FIG. 1, a water purifying apparatus 1 according to a first embodiment of this invention is equipped in a beverage dispenser for producing and vending a beverage, such as juice and coffee, in response to a vending signal. The water purifying apparatus 1 is supplied with tap water as raw water to produce purified water which is fed to a terminal unit or a dispensing valve.

As illustrated in FIG. 1, the water purifying apparatus 1 comprises a cylindrical water tank 2 of a closed structure. The water tank 2 comprises a housing 21 having an open end at its lower end, and a cap 22 engaged with the housing 21 to close the open end of the housing 21. The cap 22 is provided with an inlet port 22a formed near its peripheral edge to introduce the raw water from a water supply pipe 3 into the housing 21. The cap 22 is also provided with an outlet port 22b formed at its center to deliver the purified water from the housing 21 through a water delivery pipe 4 to the dispensing valve.

The cap 22 is made of an electrical insulating material such as resin. The water supply pipe 3 is provided with a flow rate sensor 31 for detecting a flow rate of the raw water. When the flow rate of the raw water in the water supply pipe 3 exceeds a predetermined level, i.e., when the dispensing valve is opened, the flow rate sensor 31 produces a flow rate detection signal. The flow rate sensor 31 will be referred to as a flow rate detecting arrangement.

Figure 1A:
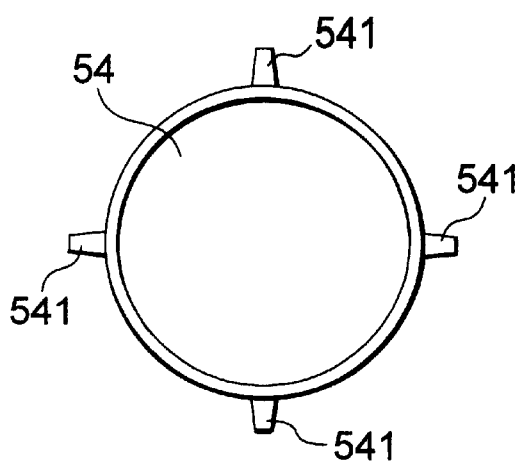
FIG. 1A is a plan view of a cap illustrated in FIG. 1.

In the water tank 2 of the above-mentioned structure, an electrode unit 5 is mounted as a chlorine generator on the cap 22. The electrode unit 5 comprises a cylindrical inner electrode 51 and a cylindrical outer electrode 52 concentrically arranged around the inner electrode 51 with a predetermined distance (for example, 3 to 5 mm) kept therebetween. Each of the inner and the outer electrodes 51 and 52 comprises a titanium base material coated with platinum or a platinum alloy (including platinum-iridium). A circular electrode cap 54 is fitted as an end plate to a top end of the inner electrode 51 to substantially close a circular upper opening defined inside the top end. The electrode cap 54 is made of an electrical insulating material such as polypropylene. As shown in FIG. 1A, the cap 54 has a plurality of (four in the illustrated example) protrusions 541 formed on its outer periphery at positions equiangularly spaced in a circumferential direction to protrude outward in a radial direction. Each of the protrusions 541 has a radial top end engaged with an upper end of the outer electrode 52. With this structure, the inner and the outer electrodes 51 and 52 are prevented from radial movement relative to each other to keep a radial distance L between the inner and the outer electrodes 51 and 52 at the predetermined distance mentioned above. Thus, an annular cylindrical gap 500 is defined as a water channel between the inner and the outer electrodes 51 and 52. A combination of the electrode cap 54, the inner electrode 51, and the cap 22 forms a cylindrical inner space 501. In addition, an outer space 502 is defined between the outer electrode 52 and an inner wall of the housing 21. Between the top ends of the inner and the outer electrodes 51 and 52, an opening 53a is defined except the protrusions 541 of the cap 54. To lower ends of the inner and the outer electrodes 51 and 52, electrode terminals 51b and 52b are attached and fixed. The electrode terminals 51b and 52b penetrate the cap 22 in a sealed condition to be connected to an external d.c. power supply (not shown). A combination of the electrode terminals 51b and 52b is referred to as a voltage supplying arrangement.

Figure 1B:
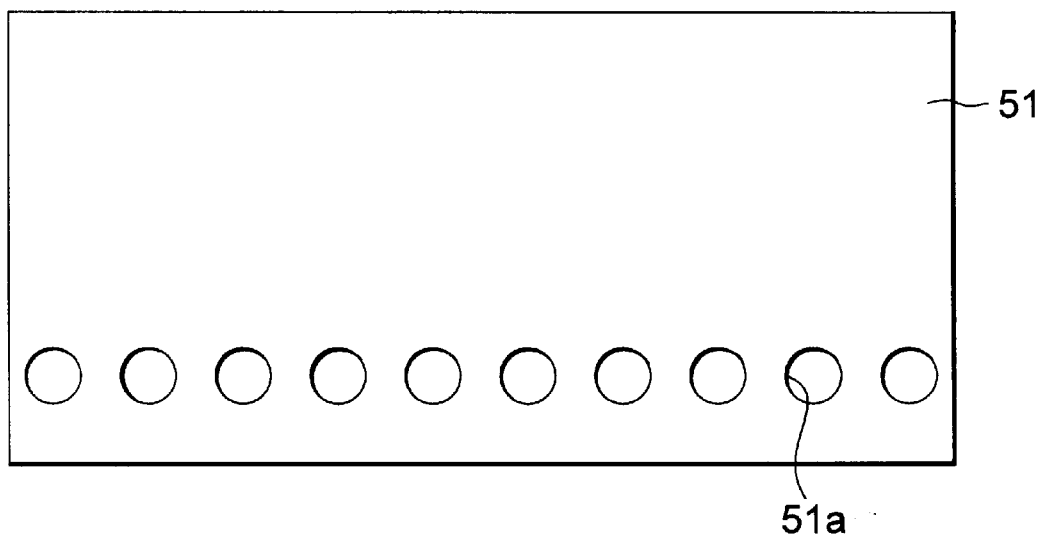
FIG. 1B is a development of an inner electrode illustrated in FIG. 1.

Referring to FIG. 1B in addition to FIG. 1, the inner electrode 51 is provided with a plurality of holes 51a formed at its lower portion to be equiangularly spaced from one another in a circumferential direction. For example, each of the holes 51a has a diameter of 8 mm. With this structure, the raw water supplied from the water supply pipe 3 through the inlet port 22a into the housing 21 during a supply period (i.e., when a beverage is dispensed and water supply is performed) at first flows into the outer space 502 around the outer electrode 52. Then, as depicted by solid arrows in the figure, the raw water flows into the gap 500 through the opening 53a to be subjected to electrolysis while flowing through the gap 500. Thus, the raw water is processed into the purified water which then passes through the holes 51a into the inner space 501. The purified water flows out from the inner space 501 through the outlet port 22b to be fed through the water delivery pipe 4 to the beverage dispenser as drinking water. A combination of the holes 51a, the inner space 501, the outlet port 22b, and the delivery pipe 4 will be referred to as a water discharge path.

Figure 1C:
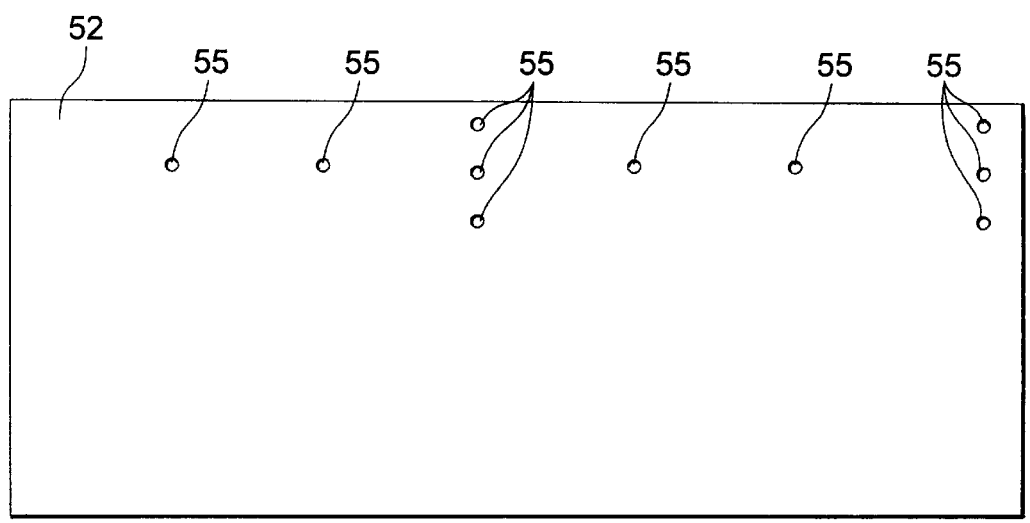
FIG. 1C is a development of an outer electrode illustrated in FIG. 1.

As illustrated in FIG. 1C, the outer electrode 52 is provided with a plurality of small perforations 55 formed at its upper portion in an arrangement illustrated in the figure. For example, each of the perforations 55 is designed to have a diameter of 1.8 mm. Thus, each perforation 55 is very small in opening area as compared with each hole 51a.

Figure 1D:
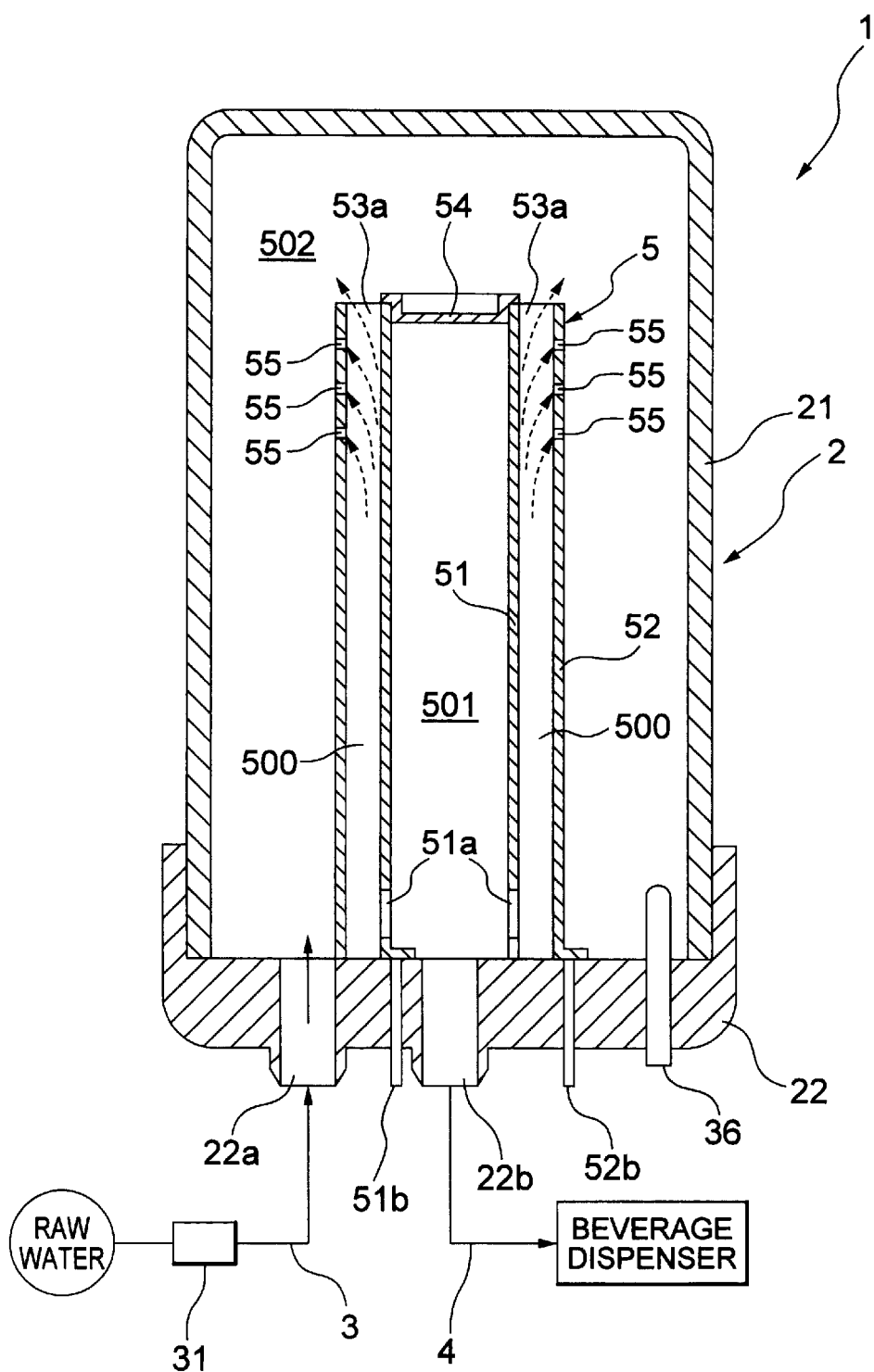
FIG. 1D is a view for describing operation of the water purifying apparatus illustrated in FIG. 1.

Referring to FIG. 1D, description will be made about an operation of the water purifying apparatus 1 according to the first embodiment.

At first during a suspension period (i.e., when the beverage is not dispensed and the water supply is suspended), a d.c. voltage is applied between the inner and the outer electrodes 51 and 52. As a consequence, the raw water (for example, the tap water containing chlorine ions) reserved in the housing 21 is electrolyzed to produce hypochlorous acid in the gap 500. Hypochlorous acid has a sterilizing effect and known as effective chlorine. Due to a difference in concentration, hypochlorous acid thus produced is naturally diffused from the gap 500 through the opening 53a or the perforations 55 to the outer space 502 around the outer electrode 52 as depicted by broken-line arrows in FIG. 1D. Thus, it is possible to achieve uniform distribution of concentration of hypochlorous acid within the housing 21 during the suspension period, in particular, uniform distribution throughout the gap 500 and the outer space 502.

As a result of the electrolysis, oxygen gas and hydrogen gas are produced as resultant gases and attracted to an inner surface of the outer electrode 52 and an outer surface of the inner electrode 51. However, these resultant gases are allowed to easily move from the gap 500 to the outer space 502 by presence of the perforations 55. This promotes the release of the resultant gases from the above-mentioned surfaces of the inner and the outer electrodes 51 and 52 and the movement towards the outer space 502. Thus, it is possible to prevent decrease in efficiency of the electrolysis by the water purifying apparatus 1 due to the stay of the resultant gases within the gap 500.

As described above, concentration of hypochlorous acid as effective chlorine having the sterilizing effect is uniformly distributed in the reserved water during the suspension period. In addition, it is possible to promote the release of the resultant gases generated by the electrolysis from the surfaces of the electrodes to thereby prevent the decrease in efficiency of electrolysis by the chlorine generator.

Figure 2:
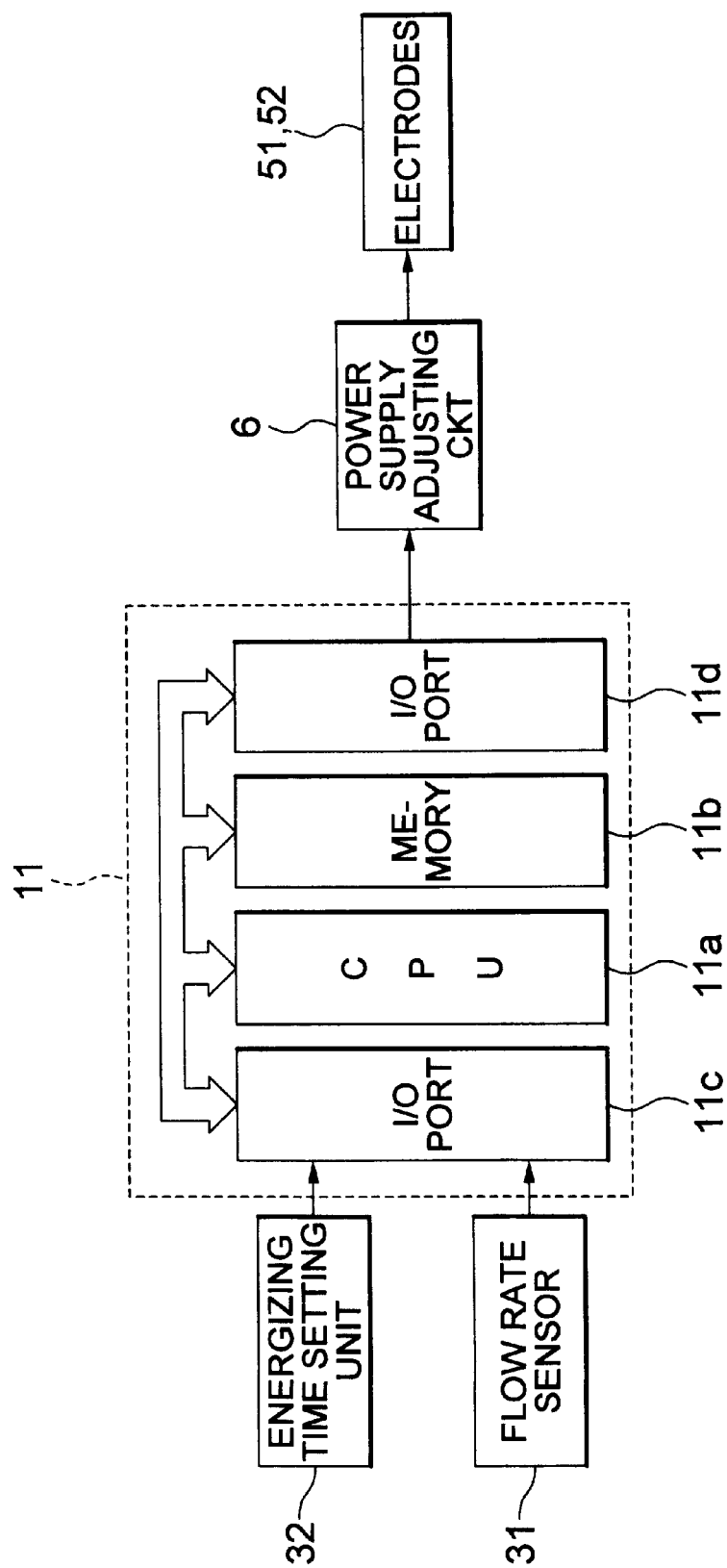
FIG. 2 is a block diagram of a control section of the water purifying apparatus illustrated in FIG. 1.

Next referring to FIG. 2, description will be made about a control section of the water purifying apparatus 1 according to the first embodiment.

The water purifying apparatus 1 comprises a control unit 11 implemented by a microcomputer and is automatically operated. The control unit 11 comprises a central processing unit (CPU) 11a and a memory 11b storing a control program. The control unit 11 has I/O ports 11c and 11d. The I/O port 11c is for input of signals from the flow rate sensor 31 and an energizing time setting unit (such as a dial switch) 32 while the I/O port 11d is for output of signals to a power supply adjusting circuit 6 for adjusting an output level of the power supply to each of the inner and the outer electrodes 51 and 52. A combination of the control unit 11 and the power supply adjusting circuit 6 will be referred to as a control arrangement which is for controlling operation or the voltage supplying arrangement in response to the flow rate detection signal.

The energizing time setting unit 32 is for setting an energizing time during the suspension period as a suspension-mode energizing time. The power supply adjusting circuit 6 performs a constant-current control. Specifically, a current level is switched between a high level (for example, 1.0 A) and a low level (for example, 0.5 A) during the supply period and the suspension period, respectively. Alternatively, the power supply adjusting circuit 6 may perform a constant-voltage control. In this case, a voltage level is switched between a high level (for example, 20 V) and a low level (for example, 10 V) during the supply period and the suspension period, respectively.

Figure 3:
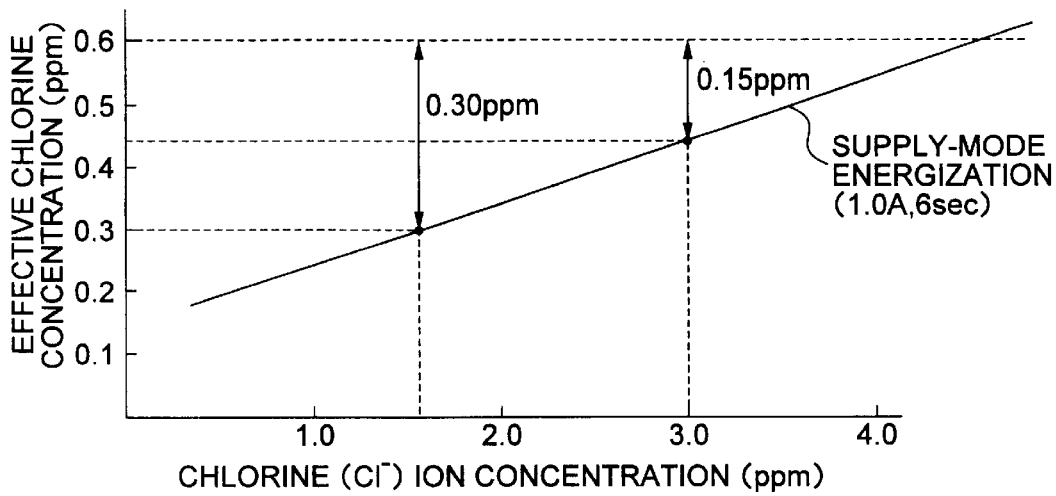
FIG. 3 is a graph showing the relationship between a chlorine ion concentration and an effective chlorine concentration.
Figure 4:
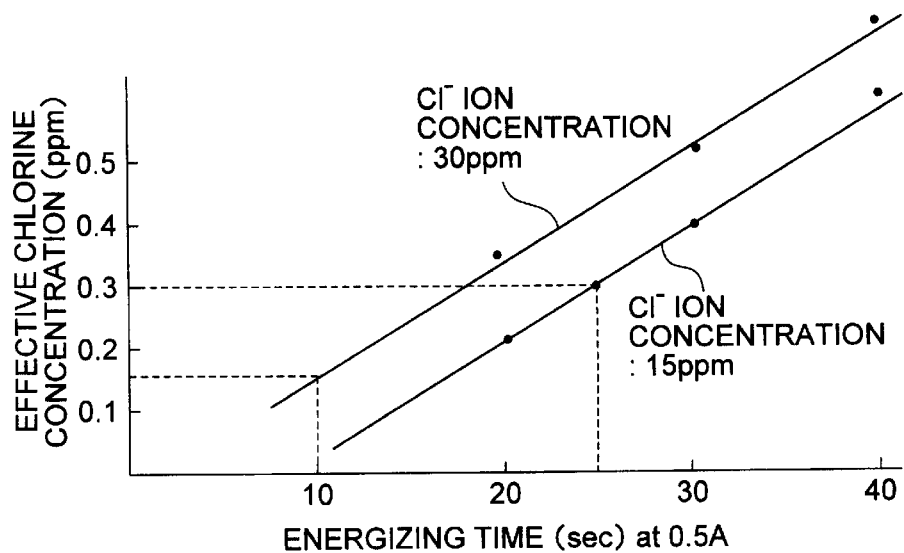
FIG. 4 is a graph showing the relationship between an energizing time and the effective chlorine concentration.
Figure 5:
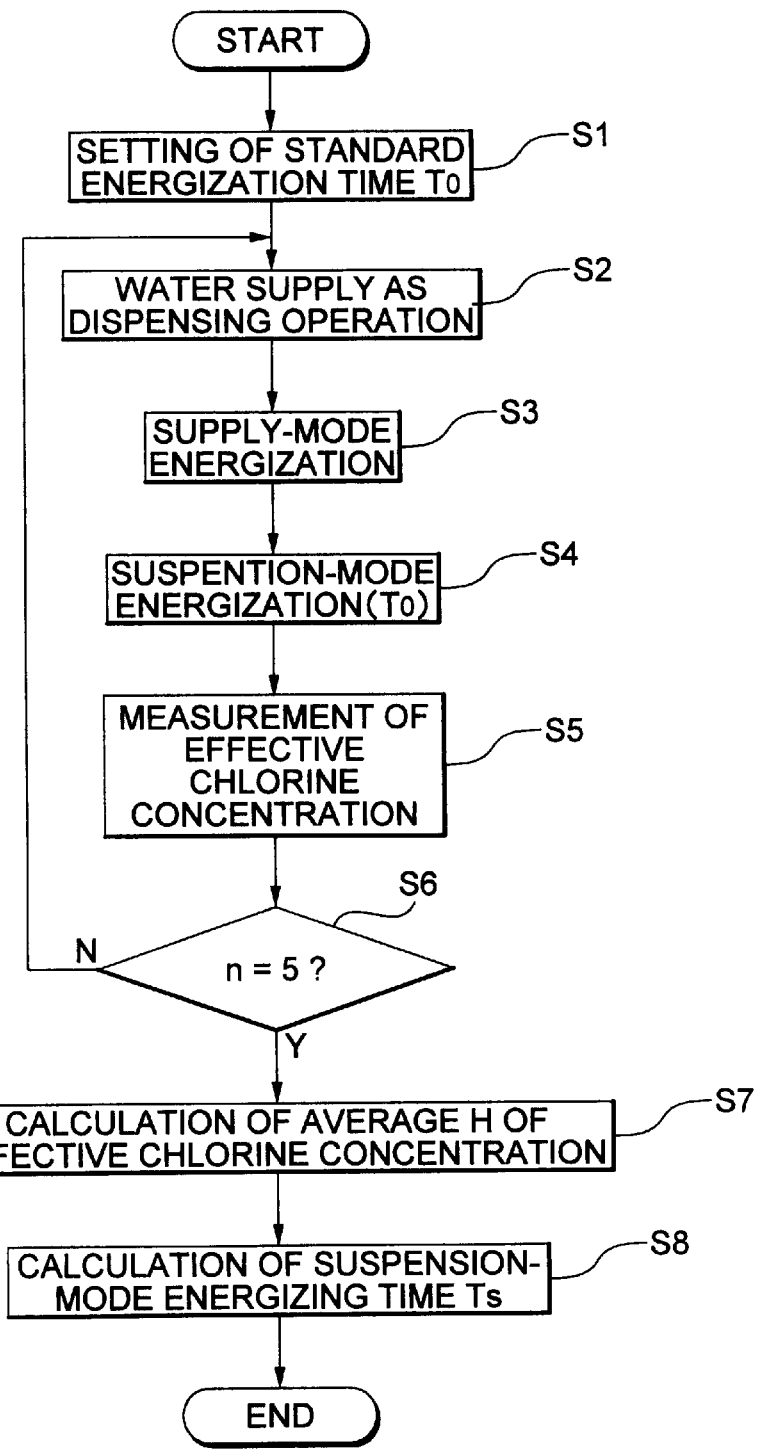
FIG. 5 is a flow chart for describing the operation of the water purifying apparatus illustrated in FIG. 1.

Referring to FIGS. 3 through 5, description will be made about calculation of the suspension-mode energizing time.

At first referring to FIG. 3, an electric current of a high level (for example, 1.0 A) is continuously supplied between the inner and the outer electrodes 51 and 52 for six seconds during the supply period. At this time, when the raw water is the tap water containing chlorine ions (Cl⁻) at a concentration of 15 ppm, hypochlorous acid (HOCl) as effective chlorine is produced at a concentration of 0.3 ppm. When the raw water is the tap water containing chlorine ions (Cl⁻) at a concentration of 30 ppm, hypochlorous acid (HOCl) as effective chlorine is produced at a concentration of 0.45 ppm. It is noted here that the concentration of effective chlorine adapted for the beverage to be dispensed is generally 0.6 ppm. Therefore, in case of the tap water having a chlorine ion concentration of 15 ppm, there is a shortage of 0.3 ppm (=0.6 ppm −0.3 ppm) of effective chlorine. On the other hand, in case of the tap water having a chlorine ion concentration of 30 ppm, there is a shortage of 0.15 ppm (=0.6 ppm −0.45 ppm) of effective chlorine.

In order to preliminarily compensate the shortage of effective chlorine during the suspension period, the electric current is supplied between the inner and the outer electrodes 51 and 52 during the suspension period. By way of example, it is assumed that the current level is equal to 0.5 A. In case where the tap water has a chlorine ion concentration of 15 ppm and 30 ppm, energization must be performed for 25 seconds and 10 seconds, respectively, as seen from FIG. 4.

Taking the above-mentioned relationship into consideration, the suspension-mode energizing time is determined as follows. Referring to FIG. 5, a standard energizing time $T_0$ (for example, 30 seconds) is at first set for the inner and the outer electrodes 51 and 52 (step S1).

Next, the water purifying apparatus 1 is supplied with the raw water for a predetermined time duration (for example, 6 seconds) as a provisional vending operation (step S2). Simultaneously with the start of the water supply, supply-mode energization (for example, 1 A for 6 seconds) is carried out (step S3). Simultaneously with the end of the water supply and the supply-mode energization, suspension-mode energization (for example, 0.5 A for 30 seconds) is carried out (step S4). After completion of the suspension-mode energization, the purified water is collected from the water delivery pipe 4 between the water purifying apparatus 1 and the beverage dispenser to measure the concentration of effective chlorine (step S5). The steps S2 through S5 are repeated five times (step S6). Calculation is made of an average measurement H (ppm) over five measurements thus obtained (step S7). From the average measurement H and the standard energizing time $T_0$, the suspension-mode energizing time $T_S$ is calculated by:

$$T_S = 30 \times (S/H),$$

where S represents a selected concentration of effective chlorine adapted for the beverage to be dispensed. For example, the selected concentration S is equal to 0.6 ppm. When the chlorine ion concentration of the tap water supplied as the raw water to the water purifying apparatus 1 is low, the average measurement H of the effective chlorine concentration is smaller than the selected concentration S so that the value of S/H in the above equation is equal to or greater than unity. Therefore, the suspension-mode energizing time $T_S$ is greater than 30 seconds. On the other hand, when the chlorine ion concentration of the tap water supplied to the water purifying apparatus 1 is high, the average measurement H of the effective chlorine concentration is greater than the selected concentration S so that the value of S/H in the above equation is smaller than unity. Therefore, the suspension-mode energizing time $T_S$ is smaller than 30 seconds.

Figure 6:
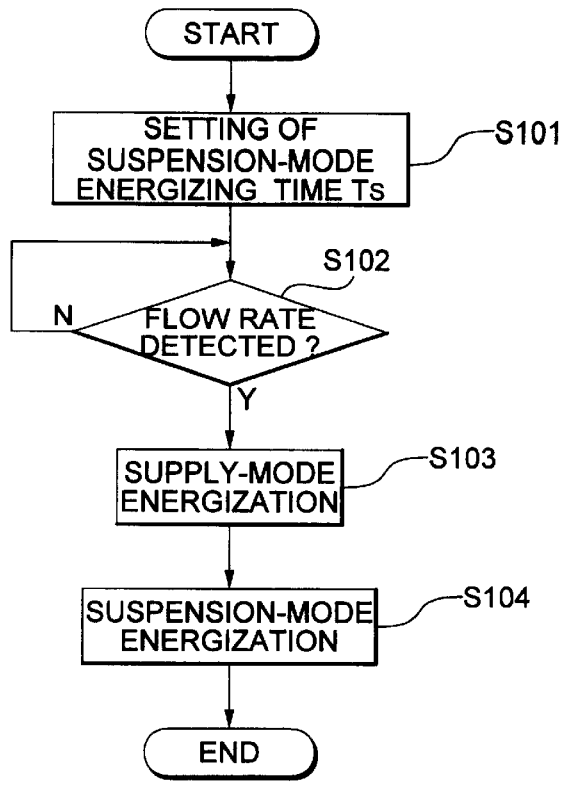
FIG. 6 is a flow chart for describing the operation of the water purifying apparatus illustrated in FIG. 1 following the operation in FIG. 5.
Figure 7:
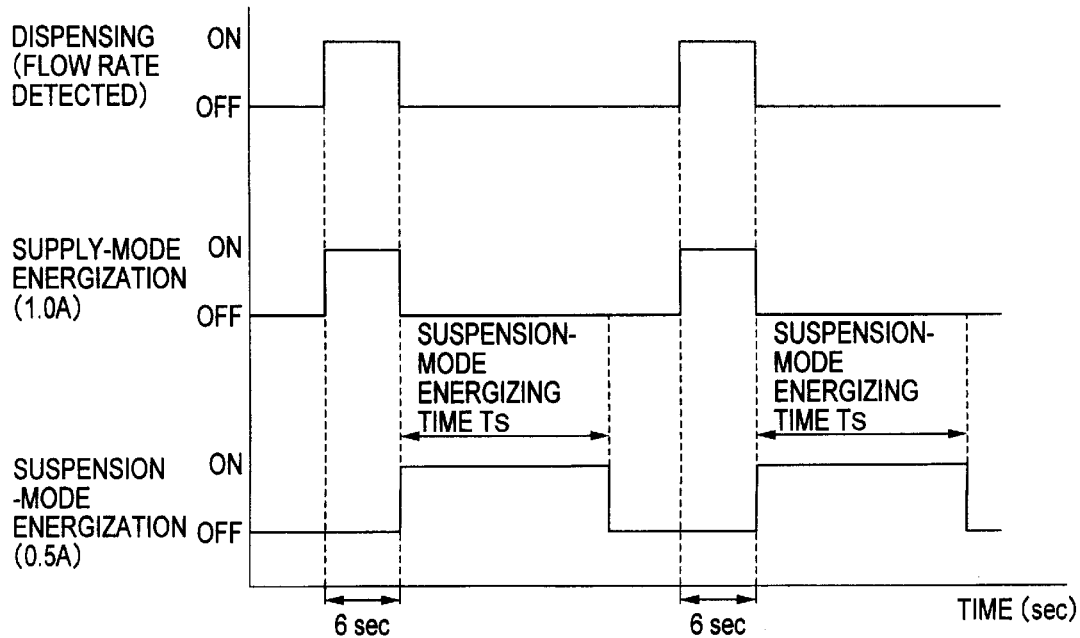
FIG. 7 is a time chart for describing the operation in FIG. 6.

After completion of the above-mentioned calculation of the suspension-mode energizing time $T_S$, the water purifying apparatus 1 performs an operation illustrated in FIG. 6. Referring to FIG. 6, the suspension-mode energizing time $T_S$ calculated in the step S8 is set in the energizing time setting unit 32 (step S101). Thereafter, when the flow rate sensor 31 detects whether or not at least a predetermined amount of water flows through the water supply pipe 3, i.e., when it is judged that the beverage is dispensed (step S102), the supply-mode energization (for example, 1 A for 6 seconds) is immediately started (step S103). After completion of the supply-mode energization, the suspension-mode energization is immediately carried out at a predetermined current level, for example, 0.5 A (step S104) for the suspension-mode energizing time $T_S$ calculated in the step S8. Referring to FIG. 7, the above-mentioned steps S102 through S104 are illustrated along a time axis, i.e., with the lapse of time.

As described above, according to the first embodiment, the suspension-mode energizing time is calculated in correspondence to the chlorine ion concentration of the tap water as the raw water. Even if the chlorine ion concentration of the tap water exhibits daily or hourly variation and even if the range of such daily or hourly variation is different due to any regional difference, it is possible to continuously keep a desired concentration or amount of effective chlorine in the purified water discharged from the water purifying apparatus.

Figure 8:
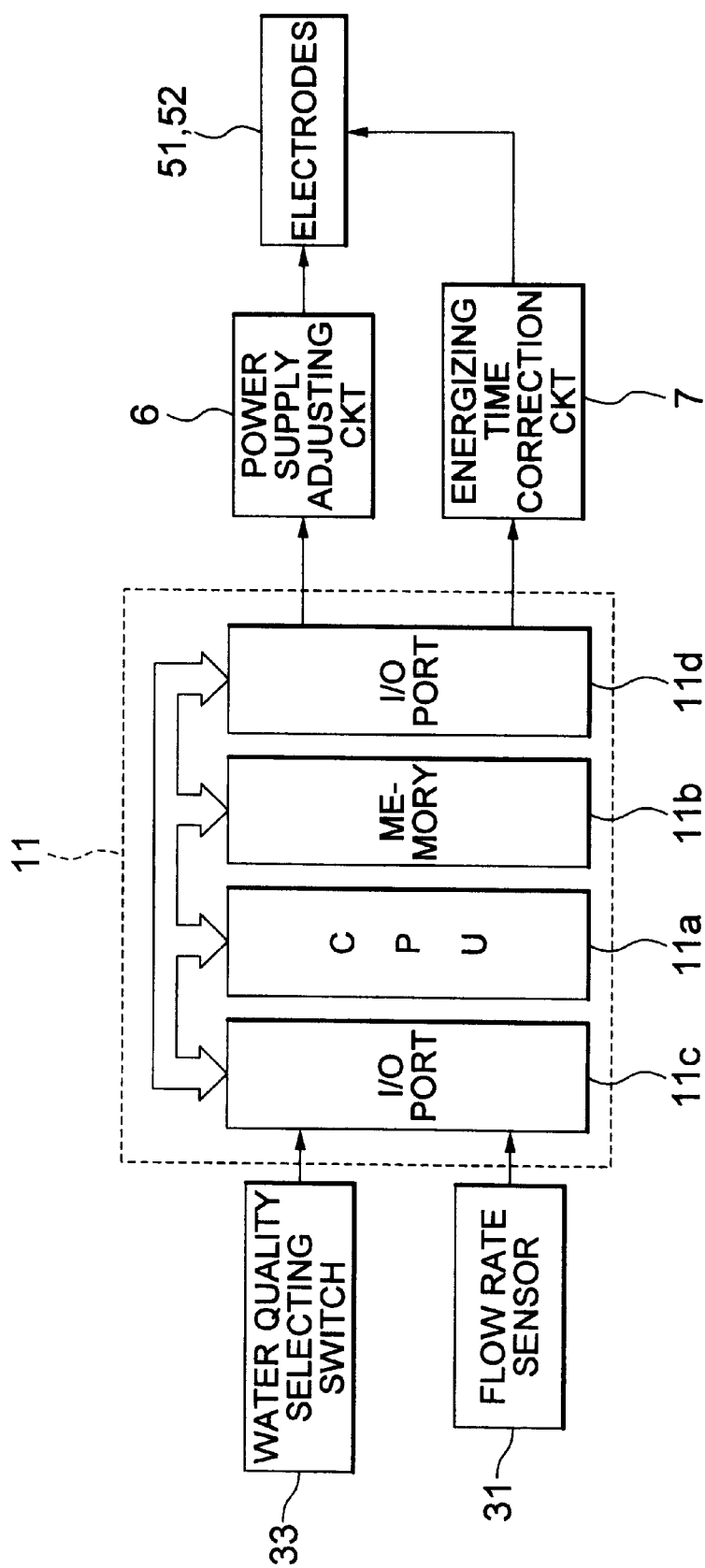
FIG. 8 is a block diagram showing a control section of a water purifying apparatus according to a second embodiment of this invention.
Figure 9:
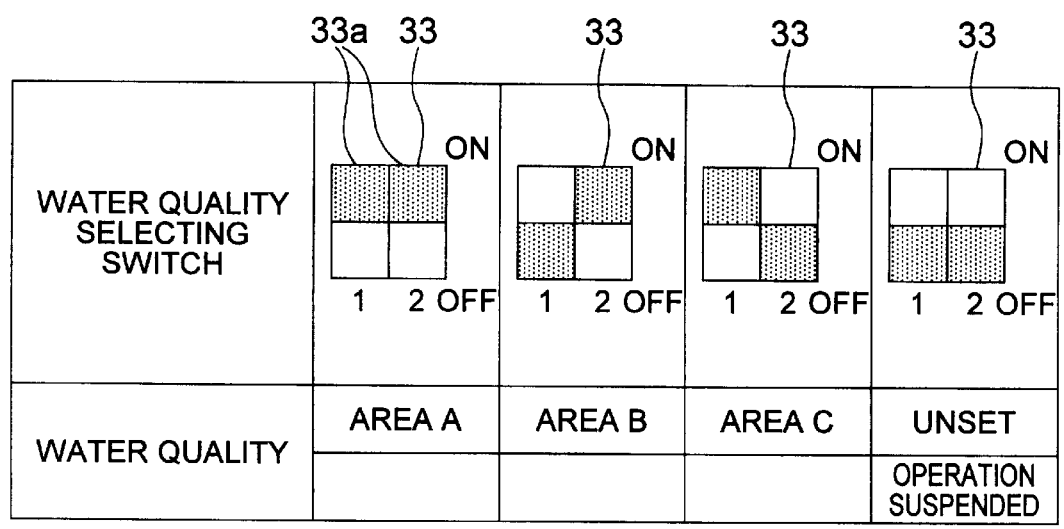
FIG. 9 is a view for describing a water quality selecting switch illustrated in FIG. 8.

Referring to FIGS. 8 and 9, a water purifying apparatus according to a second embodiment of this invention is similar in structure to the first embodiment except that the energizing time setting unit 32 is replaced by a water quality selecting switch 33 and that an energizing time correction circuit 7 is added. The energizing time correction circuit 7 is arranged between the I/O port 11d and the inner and the outer electrodes 51 and 52. With this structure, an initial suspension-mode energizing time Tm initially determined is corrected by the energizing time correction circuit 7 into a corrected suspension-mode energizing time $T_R$ in response to a quality signal entered by the water quality selecting switch 33 to the control unit 11. The suspension-mode energization is carried out for the corrected suspension-mode energizing time $T_R$. The initial suspension-mode energizing time Tm is determined with reference to a range of chlorine ion concentration (10 to 20 ppm) of the tap water in the Tokyo district.

Referring to FIG. 9, description will be made about the water quality selecting switch 33. The water quality selecting switch 33 comprises four push buttons 33a adjacent to one another. Specifically, the push buttons 33a are arranged in two rows and two columns. The upper row and the lower row corresponding to an ON state and an OFF state, respectively. Each of the push buttons 33a is combined with an LED embedded on its rear side. When the push button 33a is pressed, the LED is lightened.

In the meanwhile, as regards the water quality, i.e., the chlorine ion concentration of the tap water, Japan is classified into three areas A, B, and C as seen from the following Table. Specifically, the area A includes Tokyo and Osaka where the chlorine ion concentration of the tap water is generally between 10 and 20 ppm. The area B includes Sapporo, Sendai, and Nagoya where the chlorine ion concentration of the tap water is generally lower than 10 ppm. The area C includes Kumamoto and Okinawa where the chlorine ion concentration of the tap water is generally higher than 30 ppm.

TABLE

| Area Code | Switch 1 | Switch 2 | Water Quality (Chlorine Ion Concentration) | Area |
|---|---|---|---|---|
| A | ON | ON | 10–20 ppm | Tokyo, Osaka |
| B | OFF | ON | <10 ppm | Sapporo, Sendai, Nagoya |
| C | ON | OFF | >30 ppm | Kumamoto, Okinawa |
| UNSET | OFF | OFF | Operation suspended | |

In case where the water purifying apparatus 1 is used in the area C, for example, in Okinawa, the push buttons 33a are selectively lightened to indicate ON and OFF in the left and the right columns, respectively, as seen from FIG. 9. In this event, the energizing time correction circuit 7 corrects the initial suspension-mode energizing time Tm into the corrected suspension-mode energizing time $T_R$ which is equal to 60% of the former. For example, it is assumed that the initial suspension-mode energizing time Tm is equal to 25 seconds. Then, the corrected suspension-mode energizing time $T_R$ is equal to 15 seconds (=25 seconds×0.6). Thus, the amount of effective chlorine generated during the suspension period is reduced.

Next, in case where the water purifying apparatus 1 is used in the area B, for example, in Sapporo, the push buttons 33a are selectively lightened to indicate OFF and ON in the left and the right columns, respectively, as seen from FIG. 9. In this event, the energizing time correction circuit 7 corrects the initial suspension-mode energizing time Tm into the corrected suspension-mode energizing time $T_R$ which is equal to 140% of the former. For example, it is assumed that the initial suspension-mode energizing time Tm is equal to 25 seconds. Then, the corrected suspension-mode energizing time $T_R$ is equal to 35 seconds (=25 seconds×1.4). Thus, the amount of effective chlorine generated during the suspension period is increased.

In case where the water purifying apparatus 1 is used in the area A, for example, in Tokyo, the push buttons 33a are selectively lightened to indicate ON in both of the left and the right columns, as seen from FIG. 9. In this event, no substantial correction is executed by the energizing time correction circuit 7 so that the suspension-mode energization is performed for the initial suspension-mode energizing time Tm. It is assumed here that the initial suspension-mode energizing time Tm is equal to 25 seconds. In this event, the suspension-mode energization is performed for 25 seconds. Thus, the amount of effective chlorine generated during the suspension period is not corrected or changed.

As described above, it is possible according to the second embodiment to continuously keep a desired concentration or amount of effective chlorine in the purified water discharged from the water purifying apparatus, even if any regional difference is present in chlorine ion concentration of the tap water.

Figure 10:
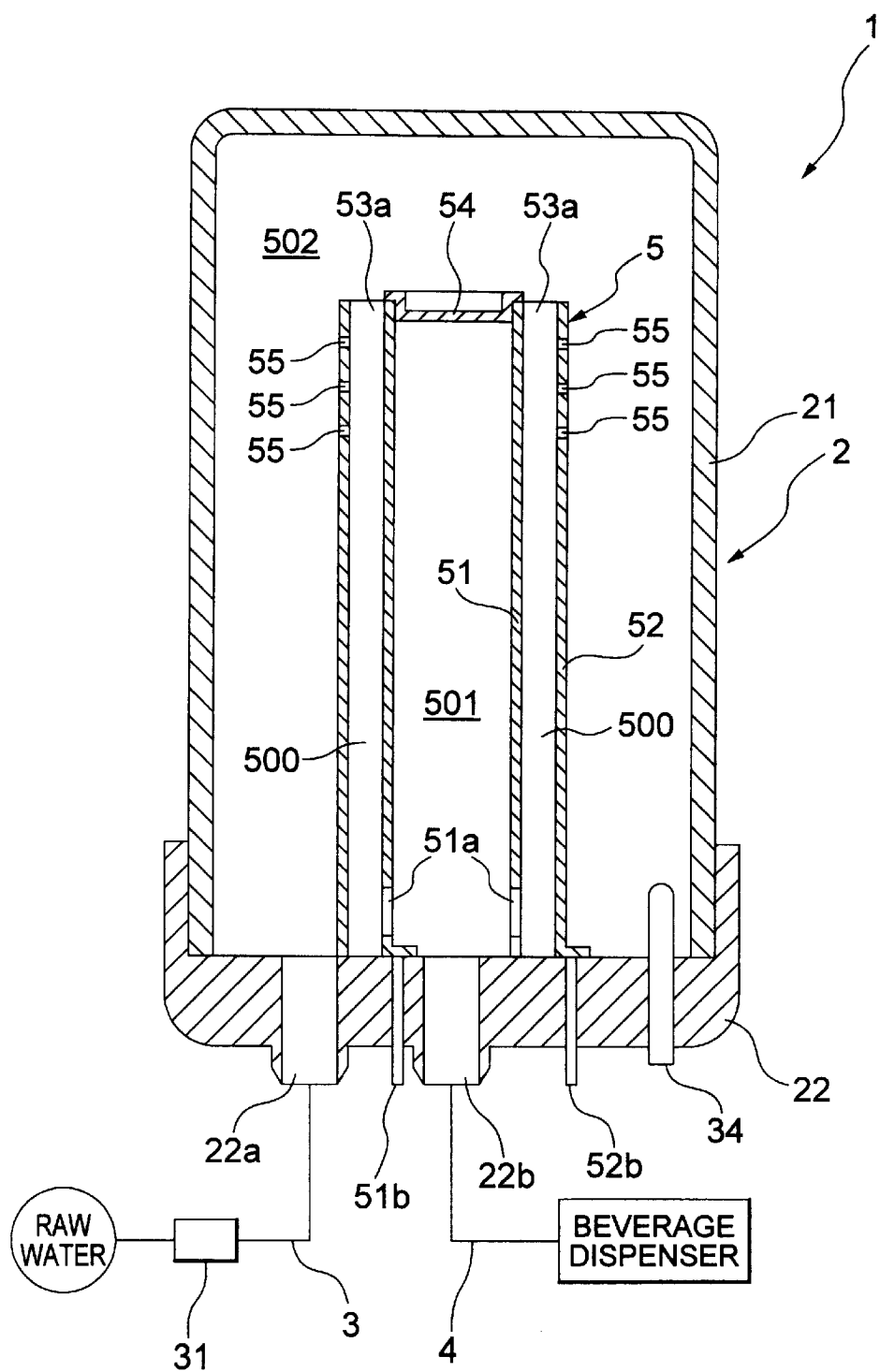
FIG. 10 is a vertical sectional view of a water purifying apparatus according to a third embodiment of this invention.
Figure 11:
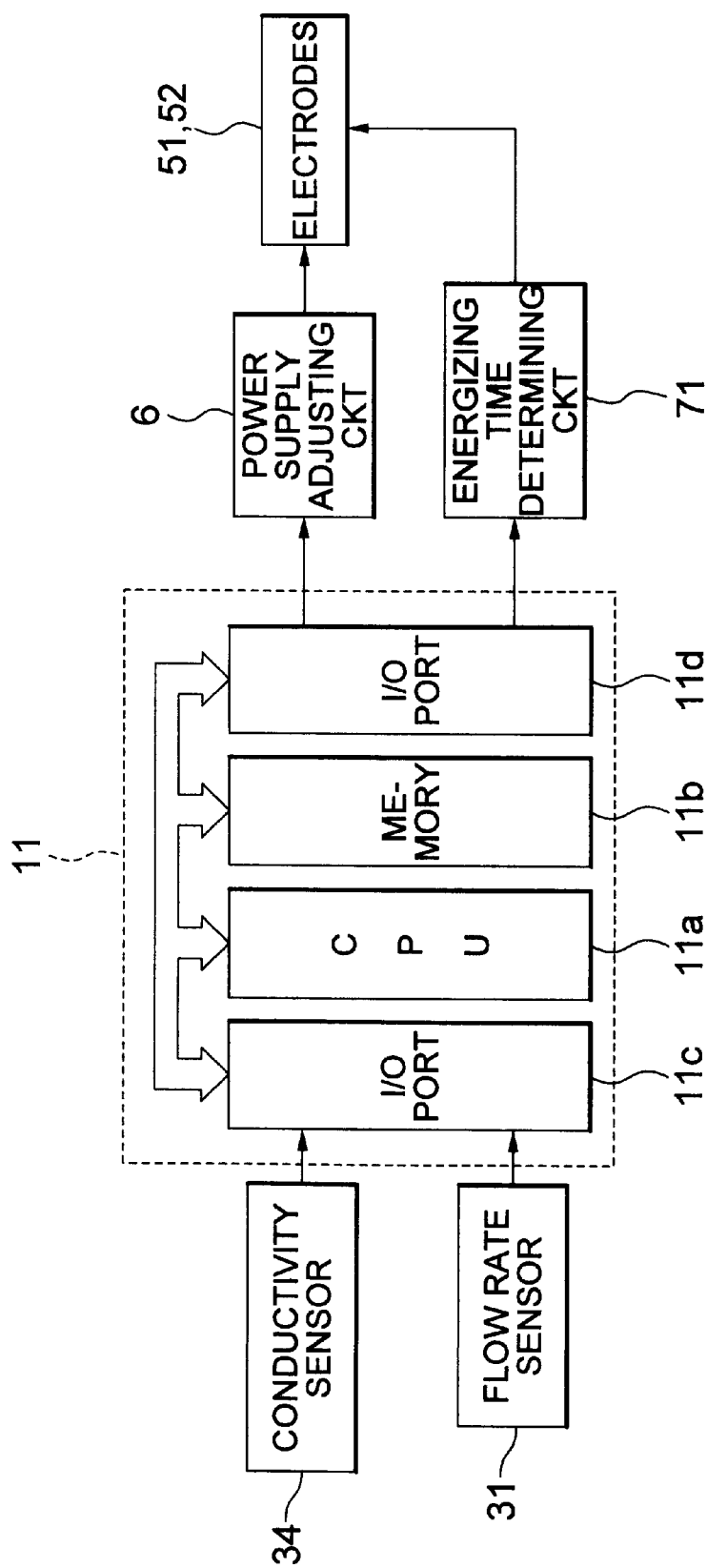
FIG. 11 is a block diagram showing a control section of the water purifying apparatus illustrated in FIG. 10.
Figure 12:
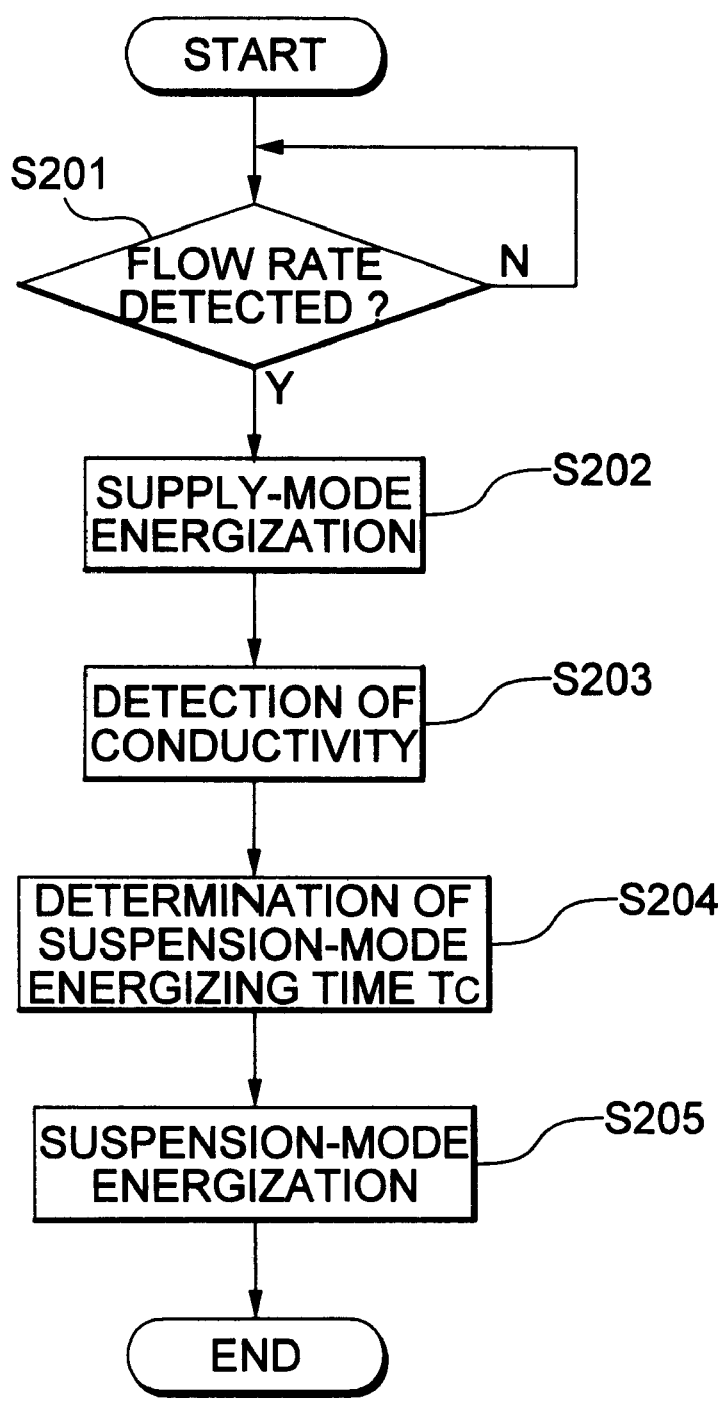
FIG. 12 is a flow chart for describing an operation of the water purifying apparatus illustrated in FIG. 10.

Referring to FIGS. 10 through 12, a water purifying apparatus according to a third embodiment is similar in structure to the first embodiment except that the energizing time setting unit 32 is replaced by a conductivity sensor 34 and that an energizing time determination circuit 71 is added. The energizing time determination circuit 71 is arranged between the I/O port 11d and the inner and the outer electrodes 51 and 52. As illustrated in FIG. 10, the conductivity sensor 34 penetrate the cap 22 in a sealed condition with its top end protruding inside of the water tank 2. With this structure, the conductivity sensor 34 detects the conductivity of reserved water reserved in the water tank 2 to produce a conductivity detection signal. In response to the conductivity detection signal, the energizing time determination circuit 71 determines a determined suspension-mode energizing time Tc. The suspension-mode energization is performed for the determined suspension-mode energizing time Tc. It is noted here that the conductivity varies in correspondence to the variation in chlorine ion concentration of the reserved water in the water tank 2. Furthermore, the amount of effective chlorine generated in the water tank 2 varies in correspondence to the variation in chlorine ion concentration in the water tank 2.

Referring to FIG. 12, an operation of the water purifying apparatus 1 of the third embodiment will be described. At first, the flow rate sensor 31 judges whether or not at least a predetermined amount of water flows through the water supply pipe 3 (step S201). When it is judged that a predetermined amount of water flows through the water supply pipe 3, i.e., when it is judged that the beverage is dispensed, the supply-mode energization (for example, 1 A for 6 seconds) is immediately started (step S202). Immediately before completion of the supply-mode energization, the conductivity sensor 34 detects the conductivity of the reserved water in the water tank 2 to produce the conductivity detection signal (step S203). In response to the conductivity detection signal, the energizing time determination circuit 71 determines the determined suspension-mode energizing time Tc (step S204). Immediately after completion of the supply-mode energization, the suspension-mode energization is performed at a predetermined current value, for example, 0.5 A for the determined suspension-mode energizing time Tc (step S205).

Thus, according to the third embodiment, the chlorine ion concentration of the water in the water tank 2 is replaced by the conductivity which is detected by the conductivity sensor 34 to determine the determined suspension-mode energizing time Tc. Even if the tap water exhibits daily or hourly variation in chlorine ion concentration and even if the range of such daily or hourly variation is different due to any regional difference, it is possible to continuously keep a desired concentration or amount of effective chlorine in the purified water discharged from the water purifying apparatus. In the third embodiment, the chlorine ion concentration of the water in the water tank 2 is replaced by the conductivity as described above. Alternatively, the chlorine ion concentration may be directly detected by the use of a chlorine ion sensor. Further alternatively, an electric resistance which is a reciprocal of the conductivity may be detected by the use of a electric resistance sensor.

Figure 13:
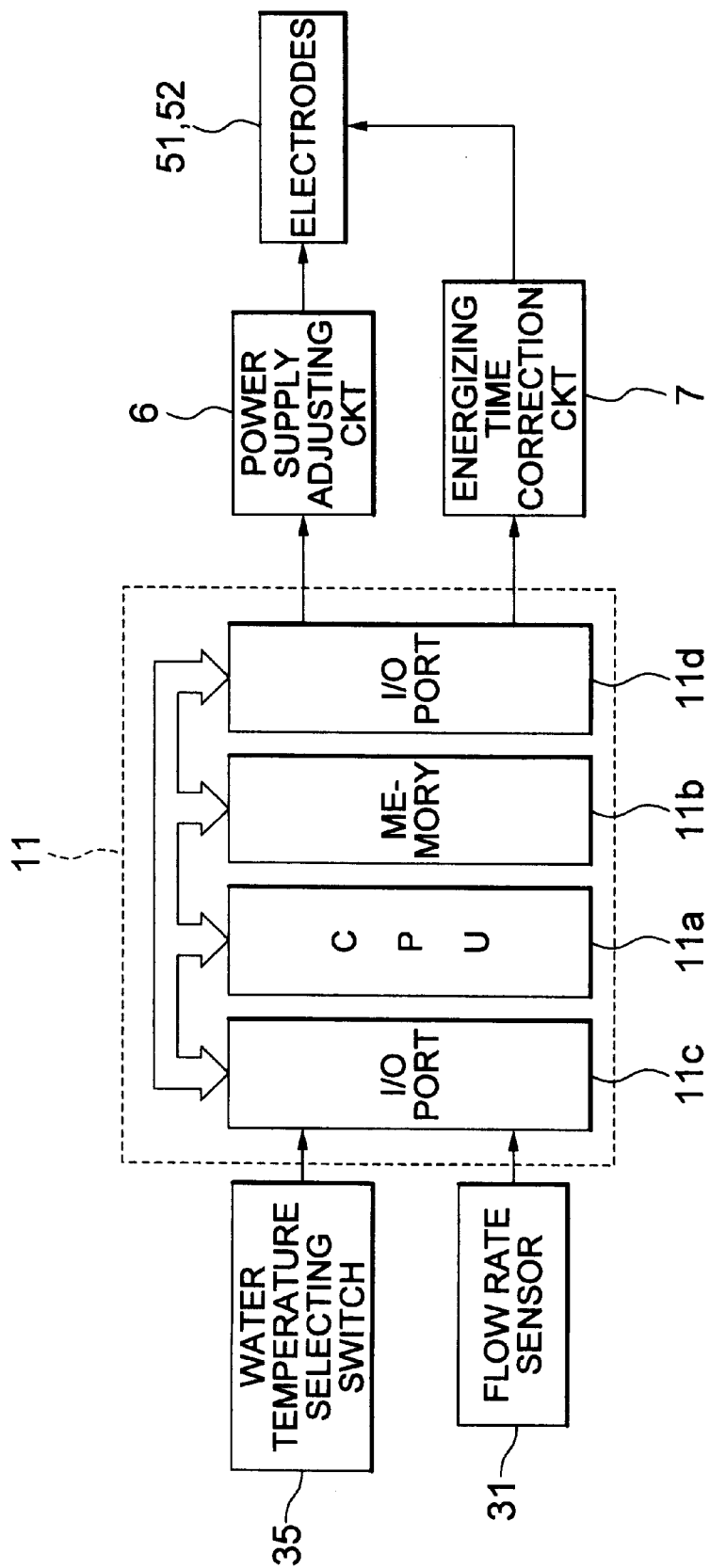
FIG. 13 is a block diagram showing a control section of a water purifying apparatus according to a fourth embodiment.
Figure 14:
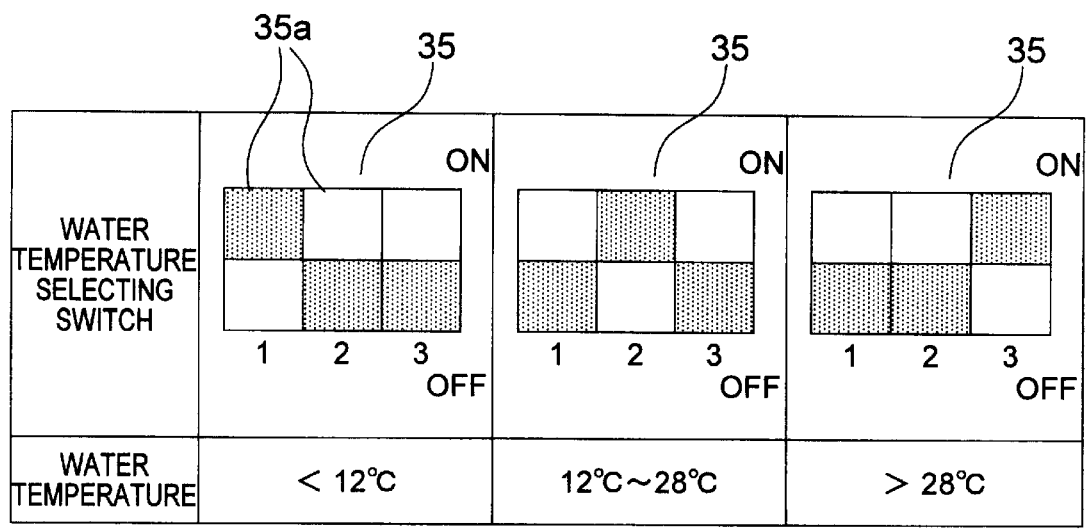
FIG. 14 is a view for describing a water temperature selecting switch in FIG. 13.

Referring to FIGS. 13 and 14, a water purifying apparatus 1 according to a fourth embodiment is similar in structure to the second embodiment except that the water quality selecting switch 33 is replaced by a water temperature selecting switch 35. With this structure, the energizing time correction circuit 7 is responsive to a water temperature signal supplied from the water temperature selecting switch 35 to the control unit 11 and corrects the initial suspension-mode energizing time Tm. The suspension-mode energization is performed for the corrected suspension-mode energizing time $T_R$. The initial suspension-mode energizing time Tm is determined with reference to a range of temperature variation (12 to 28° C.) of the tap water in the Tokyo district.

As illustrated in FIG. 14, the water temperature selecting switch 35 comprises six push buttons 35a adjacent to one another. Specifically, the push buttons 35a are arranged in two rows and three columns. The upper and the lower rows represents an ON state and an OFF state, respectively. The push buttons 35a are selectively turned ON and OFF to indicate three kinds of ON/OFF patterns in correspondence to three kinds of temperature ranges. Like in the second embodiment, each of the push buttons 35a is combined with an LED embedded on its rear side. When the push button 35a is pressed, the LED is lightened.

When a temperature gauge (not shown) detects that the temperature of the tap water supplied to the water purifying apparatus 1 is lower than 12° C., the push buttons 35a are selectively lightened to indicate ON, OFF, and OFF in the left, the center, and the right columns, respectively, in correspondence to the temperature range lower than 12° C., as seen from FIG. 14. In this event, the energizing time correction circuit 7 corrects the initial suspension-mode energizing time Tm into the corrected suspension-mode energizing time $T_R$ which is equal to 60% of the former. For example, it is assumed that the initial suspension-mode energizing time Tm is equal to 25 seconds. Then, the corrected suspension-mode energizing time $T_R$ is equal to 15 seconds (=25 seconds×0.6). Thus, amount of effective chlorine generated during the suspension period is reduced.

When it is detected that the temperature of the tap water supplied to the water purifying apparatus 1 is higher than 28° C., the push buttons 35a are selectively lightened to indicate OFF, OFF, and ON in the left, the center, and the right columns, respectively, in correspondence to the temperature range higher than 28° C., as seen from FIG. 14. In this event, the energizing time correction circuit 7 corrects the initial suspension-mode energizing time Tm into the corrected suspension-mode energizing time $T_R$ which is equal to 140% of the former. For example, it is assumed that the initial suspension-mode energizing time Tm is equal to 25 seconds. Then, the corrected suspension-mode energizing time $T_R$ is equal to 35 seconds (=25 seconds×1.4). Thus, the amount of effective chlorine generated during the suspension period is increased.

When it is detected that the temperature of the tap water supplied to the water purifying apparatus 1 is between 12° C. and 28° C., the push buttons 35a are selectively lightened to indicate OFF, ON, and OFF in the left, the center, and the right columns, respectively, in correspondence to the temperature range between 12° C. and 28° C., as seen from FIG. 14. In this event, no substantial correction is executed by the energizing time correction circuit 7 so that the suspension-mode energization is performed for the initial suspension-mode energizing time Tm. It is assumed here that the initial suspension-mode energizing time Tm is equal to 25 seconds. In this event, the suspension-mode energization is performed for 25 seconds. Thus, the amount of effective chlorine generated during the suspension period is not corrected or changed.

As described above, it is possible according to the fourth embodiment to continuously keep a desired concentration or amount of effective chlorine in the purified water discharged from the water purifying apparatus, even if the temperature of the tap water supplied to the water purifying apparatus exhibits daily or hourly variation and even if the range of such daily or hourly variation is different depending upon any regional difference.

Figure 15:
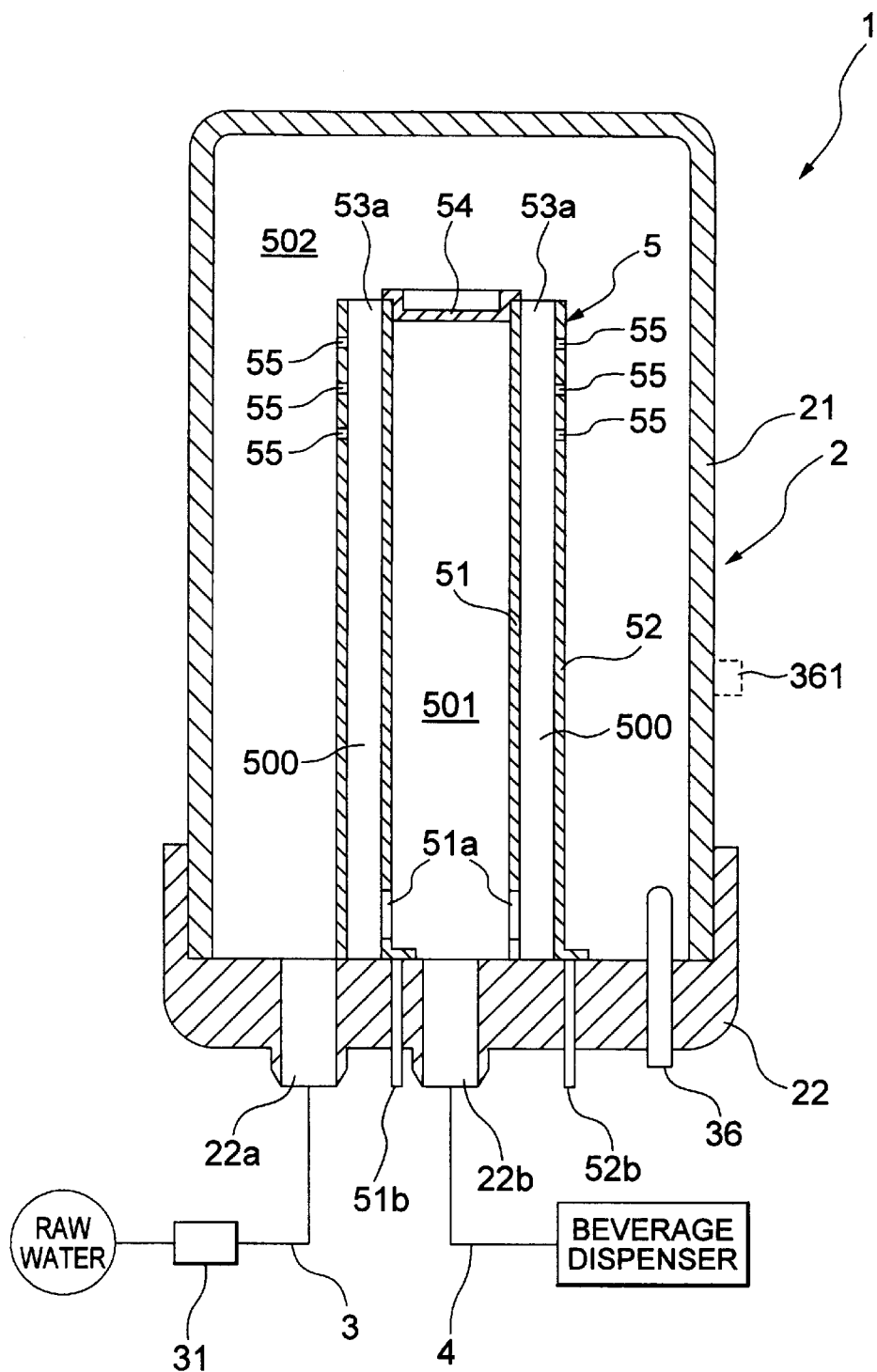
FIG. 15 is a vertical sectional view of a water purifying apparatus according to a fifth embodiment of this invention.
Figure 16:
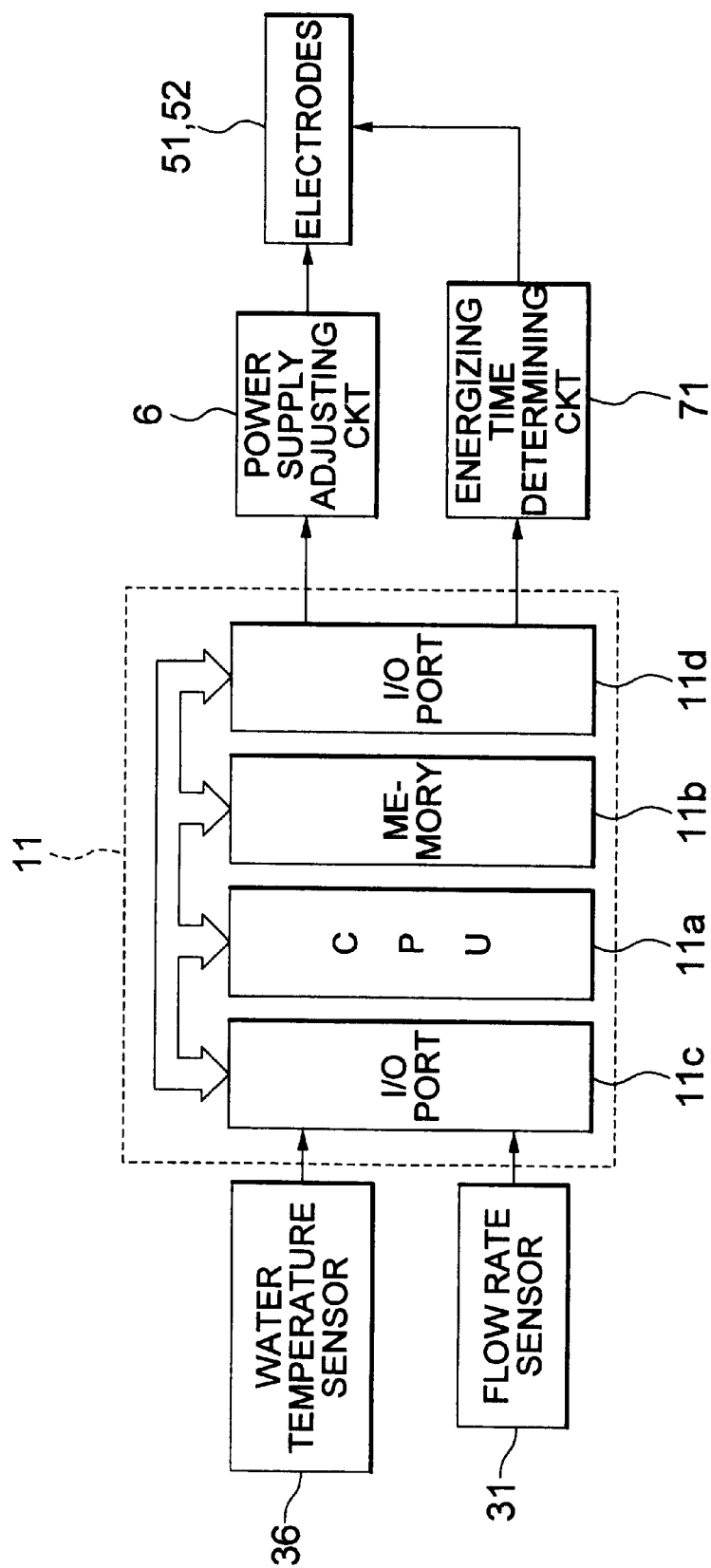
FIG. 16 is a block diagram showing a control section of the water purifying apparatus illustrated in FIG. 15.
Figure 17:
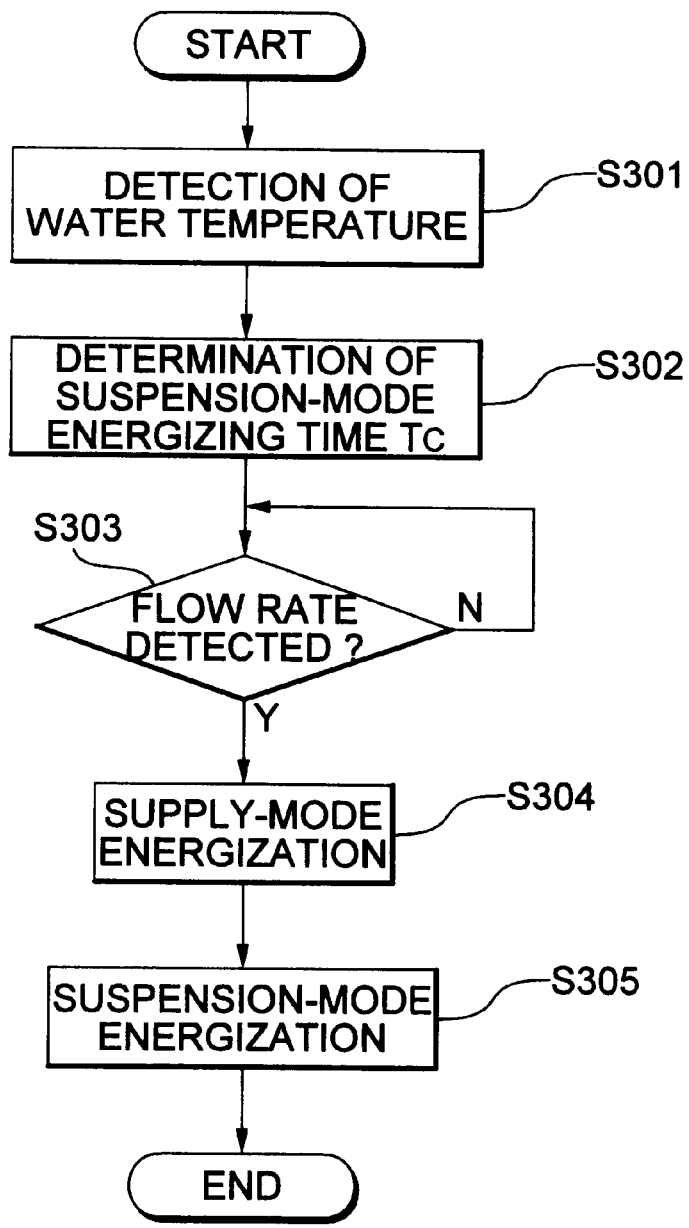
FIG. 17 is a view for describing operation of the water purifying apparatus illustrated in FIG. 15.

Referring to FIGS. 15 through 17, a water purifying apparatus 1 according to a fifth embodiment of this invention is similar in structure to the third embodiment except that the conductivity sensor 34 is replaced by a temperature sensor 36. As illustrated in FIG. 15, the temperature sensor 36 penetrate the cap 22 in a sealed condition with its top end protruding inside of the water tank 2. With this structure, the water temperature of the reserved water in the water tank 2 is detected by the temperature sensor 36 to produce a temperature detection signal. In response to the temperature detection signal, the energizing time determination circuit 71 determines the determined suspension-mode energizing time Tc. The suspension-mode energization is performed for the determined suspension-mode energizing time Tc. It is noted here that the amount of effective chlorine generated in the water tank 2 varies in correspondence to the variation in water temperature in the water tank 2. The water temperature sensor 36 may be replaced by another water temperature sensor 361 attached to an appropriate position on the outer surface of the water tank 2, as depicted by a broken line in FIG. 15.

Referring to FIG. 17, description will be made about an operation of the water purifying apparatus 1 according to the fifth embodiment. At first, the water temperature sensor 36 (361) detects the water temperature of the reserved water in the water tank 2 to produce the temperature detection signal (step S301). In response to the temperature detection signal, the energizing time determination circuit 71 determines the determined suspension-mode energizing time Tc (step S302). Then, the flow rate sensor 31 judges whether or not at least a predetermined amount of water flows through the water supply pipe 3 (step S303). When it is judged that at least a predetermined amount of water flows through the water supply pipe 3, i.e., when it is judged that the beverage is dispensed, the supply-mode energization (for example, 1 A for 6 seconds) is immediately started (step S304). After completion of the supply-mode energization, the suspension-mode energization is immediately carried out at a predetermined current level, for example, 0.5 A for the determined suspension-mode energizing time Tc (step S305). Thus, according to the fifth embodiment, the water temperature sensor 36 (361) detects the water temperature of the reserved water in the water tank 2 to determine the determined suspension-mode energizing time Tc. Therefore, it is possible to continuously keep a desired concentration or amount of effective chlorine in the purified water discharged from the water purifying apparatus, even if the water temperature of the tap water supplied to the water purifying apparatus 1 exhibits daily or hourly variation and even if the range of such daily or hourly variation is different depending upon any regional difference.

As described in the foregoing, according to the first through the third embodiments of this invention, the concentration or amount of effective chlorine in the purified water is adjusted with reference to the water quality, i.e., the chlorine ion concentration of the tap water. According to the fourth and the fifth embodiments, the amount of effective chlorine is adjusted with reference to the water temperature of the tap water. As will readily be understood, the amount of effective chlorine may be adjusted by a combination of the water temperature and the water quality represented by the chlorine ion concentration of the tap water. For example, as shown in FIGS. 1 and 1D, a temperature sensor 36 can be incorporated into the first embodiment. In each of the foregoing embodiments, description is directed to the supply of the purified water from the water purifying apparatus to the beverage dispenser for commercial use. However, this invention is also applicable to the supply of the purified water to a water purification unit for domestic use.

In the second through the fifth embodiments, the amount of effective chlorine in the purified water is adjusted by the use of the water quality selecting switch 33, the conductivity sensor 34, the water temperature selecting switch 35, and the water temperature sensor 36 (361), respectively, instead of the energizing time setting unit 32 in the first embodiment. It will be understood that the first embodiment may be incorporated into each of the second through the fifth embodiments. That is, the energizing time setting unit 32 may be combined with any one of the switches and the sensors mentioned above to adjust the concentration or amount of effective chlorine in the purified water.

As described above, it is possible to continuously keep a desired concentration or amount of effective chlorine in the purified water discharged from the water purifying apparatus, even if the water quality, i.e., the chlorine ion concentration or the water temperature exhibits daily or hourly variation and even if the range of such daily or hourly variation is different depending upon any regional difference. Therefore, it is possible to prevent the concentration or amount of effective chlorine in the purified water from being reduced to decrease the sterilizing effect or from being excessively increased to produce unpleasant odor of effective chlorine.

Figure 18:
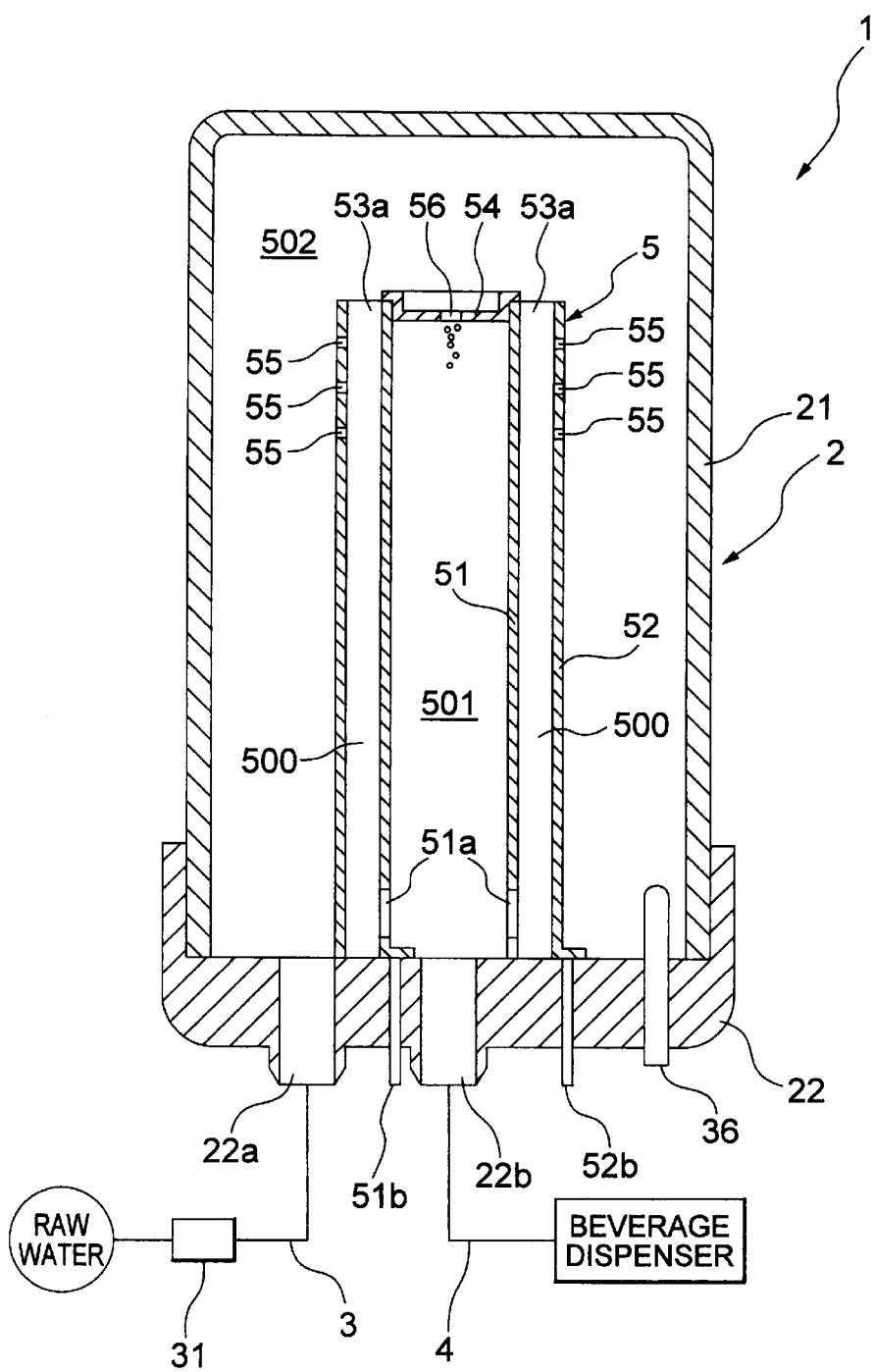
FIG. 18 is a vertical sectional view of a water purifying apparatus according to a sixth embodiment of this invention.

Referring to FIG. 18, a water purifying apparatus 1 according to a sixth embodiment of this invention is similar in structure to the fifth embodiment except that a circular opening 56 is formed at the center of the electrode cap 54.

During the supply period, the resultant gases generated by the electrolysis move from the gap 500 through the holes 51a into the inner space 501 together with the purified water. In the sixth embodiment, these resultant gases are allowed to escape from the inner space 501 through the opening 56. It is thus possible to suppress a volumetric ratio of the resultant gases contained in the inner space 501. Therefore, the resultant gases are prevented from being mixed into the purified water to be supplied to the beverage dispenser. As a result, the purified water of an appropriate amount can reliably be supplied to the beverage dispenser. The remaining structure, the operation, and the effect of this embodiment are similar to those described in conjunction with the fifth embodiment and will not be described any longer.

Figure 19:
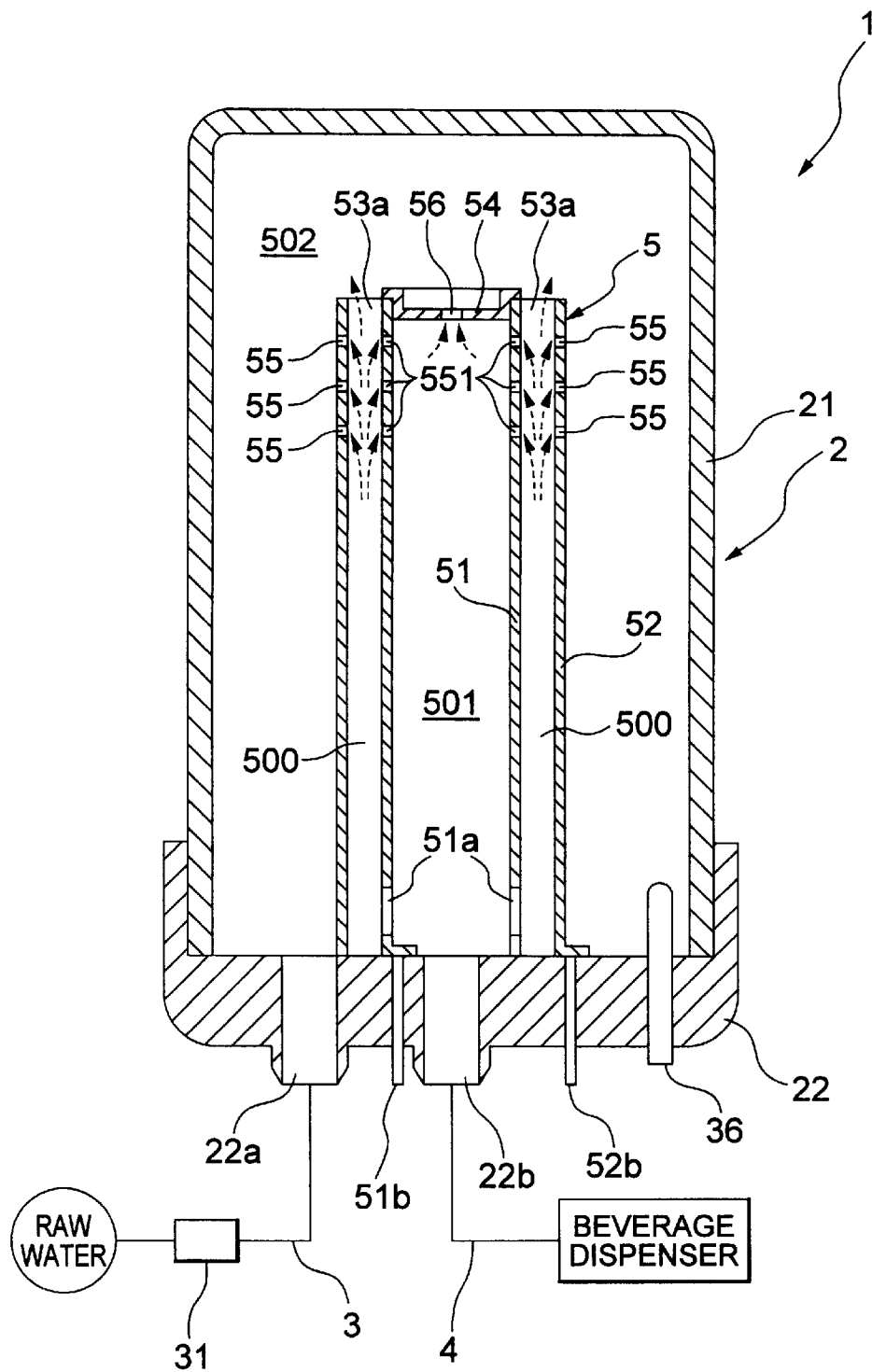
FIG. 19 is a vertical sectional view of a water purifying apparatus according to a seventh embodiment of this invention.

Referring to FIG. 19, a water purifying apparatus 1 according to a seventh embodiment of this invention is similar to the sixth embodiment except that a plurality of perforations 551 are formed in an upper portion of the inner electrode 51. The perforations 551 are similar in arrangement and opening area to the perforations 55 formed in the outer electrode 52.

During the suspension period, a part of hypochlorous acid generated by the electrolysis is naturally diffused from the gap 500 through the perforations 551 into the inner space 501 and then through the opening 56 to the outside of the electrode cap 54 as depicted by broken-line arrows in FIG. 19. On the other hand, in the manner similar to that described in conjunction with the first embodiment, the other part of hypochlorous acid is naturally diffused from the gap 500 through the opening 53a or the perforations 55 to the outer space 502 around the outer electrode 52. Thus, according to this embodiment, uniform distribution of concentration of hypochlorous acid within the housing 21 during the suspension period is further promoted. The remaining structure, the operation, and the effect of this embodiment are similar to those described in conjunction with the sixth embodiment and will not be described any longer.

On the other hand, the resultant gases staying between the inner and the outer electrodes 51 and 52 are diffused through the perforations 551 formed in the inner electrode 51 into the inner space 501 and then through the opening 56 formed in the electrode cap 54 to the outside of the electrode cap 54.

Thus, according to the seventh embodiment, the resultant gases and chlorine between the inner and the outer electrodes 51 and 52 are efficiently diffused to the outside of the inner and the outer electrodes 51 and 52. In the manner similar to the sixth embodiment, the resultant gases and chlorine staying within the inner space 501 can also be diffused to the outside. The remaining structure, the operation, and the effect are similar to those described in conjunction with the fifth embodiment.

Figure 20:
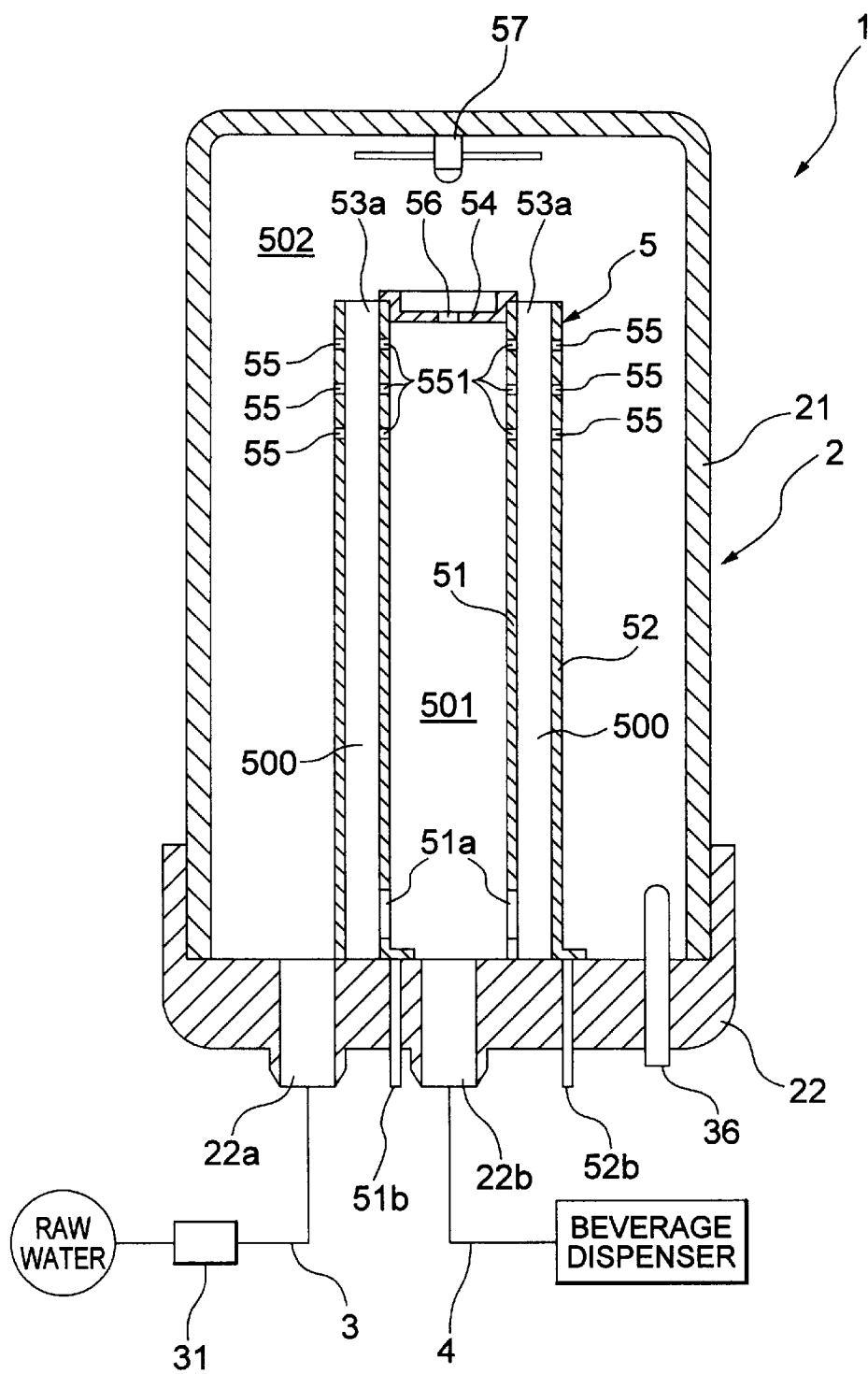
FIG. 20 is a vertical sectional view of a water purifying apparatus according to an eighth embodiment of this invention.

Referring to FIG. 20, a water purifying apparatus 1 according to an eighth embodiment is similar in structure to the seventh embodiment except that an agitator 57 is arranged at the center of an upper internal wall of the housing 21. The agitator 57 is a well-known apparatus comprising a motor and a rotary vane driven by the motor.

In the eighth embodiment, the reserved water within the housing 21 is forcedly circulated and moved by the agitator 57 during the suspension period. As a result, uniform distribution of concentration of hypochlorous acid in the reserved within the housing 21 is further promoted. The remaining structure, the operation, and the effect of this embodiment are similar to those described in conjunction with the seventh embodiment and will not be described any longer.

Figure 21:
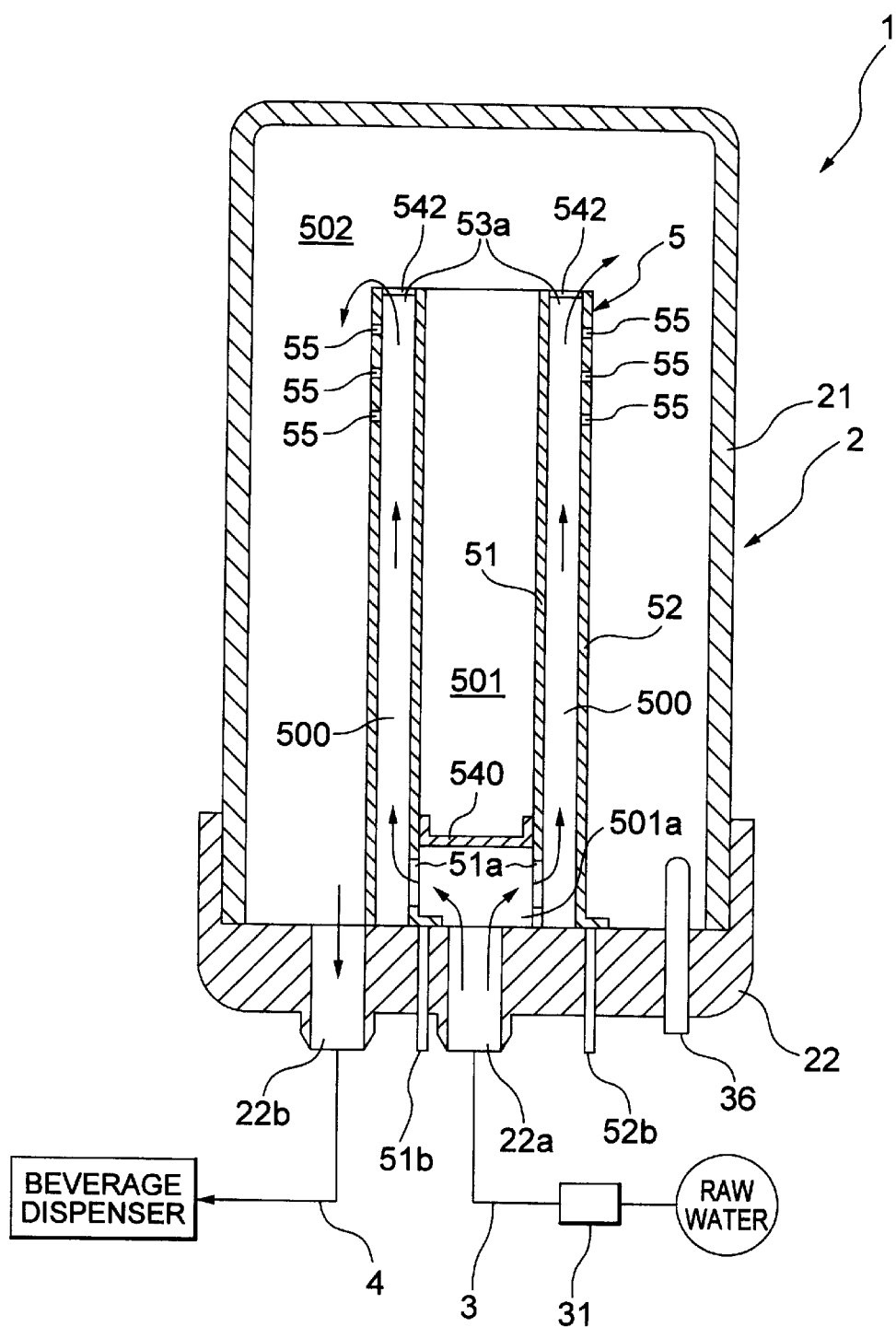
FIG. 21 is a vertical sectional view of a water purifying apparatus according to a ninth embodiment of this invention.

Referring to FIG. 21, a water purifying apparatus 1 according to a ninth embodiment is different from the first through the eighth embodiments in that the inlet port 22a is formed at the center of the cap 22 while the outlet port 22b is formed at the periphery. In addition, an inner cap 540 is fitted in the inner electrode 51 immediately above the holes 51a formed at the lower portion thereof. A combination of the inner cap 540, the inner electrode 51, and the cap 22 forms a short cylindrical space 501a. The upper ends of the inner and the outer electrodes 51 and 52 are engaged with each other by a plurality of (for example, four) locking members 542 at positions equiangularly spaced from one another in a circumferential direction. The locking members 542 may be made of, for example, an electrical insulating material such as polypropylene. Thus, the inner and the outer electrodes 51 and 52 are prevented from radial movement relative to each other. With the above-mentioned structure, the raw water supplied from the water supply pipe 3 through the inlet port 22a into the housing 21 during the supply period at first flows into the cylindrical space 501a as depicted by solid arrows. Then, the raw water flows into the gap 500 through the holes 51a to be electrolyzed while flowing through the gap 500. Thus, the raw water is processed into the purified water which passes through the opening 53a into the outer space 502. The purified water flows out from the outer space 502 through the outlet port 22b to be fed through the water delivery pipe 4 to the beverage dispenser. Thus, within the housing 21 of the water purifying apparatus 1, a water channel is formed by a combination of the inlet port 22a, the cylindrical space 501a, the holes 51a, the gap 500, the opening 53a, the outer space 502, and the outlet port 22b.

During the supply period, the resultant gases generated in the gap 500 by the electrolysis moves to an upper portion within of the housing 21 having a large volume, together with the purified water flowing from the gap 500 through the opening 53a (or the perforations 55) into the outer space 502. Thus, according to the ninth embodiment, it is possible to effectively suppress undesirable mixture of the resultant gases into the purified water in the vicinity of the outlet port 22b. As a result, an appropriate amount of purified water can reliably be fed to the beverage dispenser. The remaining structure, the operation, and the effect of this embodiment are similar to those described in conjunction with the fifth embodiment and will not be described any longer.

What is claimed is:

1. A water purifying apparatus for purifying raw water containing chlorine ions to provide purified water containing effective chlorine for dispensing from said apparatus, said water purifying apparatus comprising:

a water tank for reserving said raw water;

a cylindrical inner electrode placed in said water tank;

a cylindrical outer electrode concentrically arranged around said inner electrode to define a water channel between said inner and said outer electrodes for passing said raw water, said water channel having a first end and an opposite second end;

voltage applying means connected to said inner and said outer electrodes for applying a voltage between said inner and said outer electrodes, said voltage causing electrolysis of said raw water in said water channel to process said raw water into said purified water, at least one of said inner and said outer electrodes having a plurality of small perforations penetrating therethrough;

an inlet to said water tank for supplying said raw water to said water tank; and an outlet from said water tank for discharging all of said purified water required during a dispensing operation, said outlet being located adjacent only one of said ends of said water channel.

2. A water purifying apparatus as claimed in claim 1, wherein said inner electrode has an opening in said water tank, said water purifying apparatus further comprising an end plate substantially closing said opening, said end plate having a small opening penetrating therethrough.

3. A water purifying apparatus as claimed in claim 1, further comprising an agitator placed in said water tank for agitating said raw water in said water tank.

4. A water purifying apparatus as claimed in claim 1, further comprising:

flow rate detecting means connected to said water channel for detecting a flow rate in said water channel to produce a flow rate detection signal; and control means connected to said voltage supplying means and said flow rate detecting means and responsive to said flow rate detection signal for controlling operation of said voltage supplying means.

5. A water purifying apparatus as claimed in claim 4, wherein said flow rate detection signal is indicative of a supply period and a suspension period in which water flow through said water channel takes place and does not, respectively, said control means controlling said operation of said voltage supplying means to continuously apply said voltage between said inner and said outer electrodes during said supply period and to intermittently apply said voltage between said inner and said outer electrodes during said suspension period in accordance with an energizing time.

6. A water purifying apparatus as claimed in claim 5, further comprising water quality setting means connected to said control means for setting a water quality with reference to concentration of said chlorine ion in said raw water, said control means determining said energizing time in response to said water quality.

7. A water purifying apparatus as claimed in claim 5, further comprising electric conductivity detecting means connected to said control means for detecting an electric conductivity of said raw water in said water tank to produce a conductivity detection signal, said control means determining said energizing time in response to said conductivity detection signal.

8. A water purifying apparatus as claimed in claim 7, wherein said electric conductivity detecting means comprises one of a conductivity sensor, a chlorine ion sensor, and resistance measuring means for measuring an electric resistance between said inner and said outer electrodes.

9. A water purifying apparatus as claimed in claim 5, further comprising water temperature selecting means connected to said control means for selecting a water temperature with reference to the temperature of said raw water, said control means determining said energizing time with reference to said water temperature.

10. A water purifying apparatus as claimed in claim 5, further comprising a temperature sensor connected to said control means for detecting the temperature of said raw water in said water tank to produce a temperature detection signal, said control means determining said energizing time in response to said temperature detection signal.

11. A water purifying apparatus as claimed in claim 5, wherein said energizing time is obtained by correcting a predetermined energizing time.

12. A water purifying apparatus as claimed in claim 1, further comprising:

a water supply pipe connected to said water tank for forcedly supplying said raw water into said water tank; and a water discharge path connected to said water channel for discharging said purified water from said water channel.

* * * * *